(12) United States Patent
Jacques

(10) Patent No.: US 9,185,352 B1
(45) Date of Patent: Nov. 10, 2015

(54) MOBILE EYE TRACKING SYSTEM

(76) Inventor: Thomas Jacques, New York, NY (US)

(*) Notice: Subject to any disclaimer, the term of this patent is extended or adjusted under 35 U.S.C. 154(b) by 993 days.

(21) Appl. No.: 13/333,687

(22) Filed: Dec. 21, 2011

Related U.S. Application Data

(60) Provisional application No. 61/426,009, filed on Dec. 22, 2010.

(51) Int. Cl.
H04N 7/18 (2006.01)
A23C 9/123 (2006.01)

(52) U.S. Cl.
CPC ............... H04N 7/18 (2013.01); A23C 9/1234 (2013.01)

(58) Field of Classification Search
None
See application file for complete search history.

(56) References Cited

U.S. PATENT DOCUMENTS

| | | | |
|---|---|---|---|
| 4,950,069 A | 8/1990 | Hutchinson | |
| 5,360,971 A | 11/1994 | Kaufman et al. | |
| 5,708,862 A * | 1/1998 | Tsunekawa et al. | 396/51 |
| 6,057,851 A | 5/2000 | Luken et al. | |
| 6,204,828 B1 | 3/2001 | Amir et al. | |
| 6,367,932 B1 | 4/2002 | Donaldson | |
| 6,637,883 B1 | 10/2003 | Tengshe et al. | |
| 6,885,392 B1 | 4/2005 | Mancuso et al. | |
| 7,572,008 B2 | 8/2009 | Elvesjo et al. | |
| 7,736,000 B2 | 6/2010 | Enriquez et al. | |
| 2003/0026474 A1 * | 2/2003 | Yano | 382/154 |
| 2006/0109242 A1 | 5/2006 | Simpkins | |
| 2008/0253622 A1 * | 10/2008 | Tosa et al. | 382/117 |
| 2008/0284980 A1 | 11/2008 | Skogo et al. | |
| 2009/0103808 A1 | 4/2009 | Dey et al. | |
| 2009/0125849 A1 | 5/2009 | Bouvin et al. | |
| 2009/0315827 A1 | 12/2009 | Elvesjo et al. | |
| 2010/0014770 A1 | 1/2010 | Huggett et al. | |
| 2010/0220291 A1 * | 9/2010 | Horning et al. | 351/210 |
| 2012/0154277 A1 * | 6/2012 | Bar-Zeev et al. | 345/158 |

OTHER PUBLICATIONS

Thomas Jacques, "EyesOn Mobile Eye Tracking," Carnegie Mellon University School of Computer Science Senior Thesis, 2010.

* cited by examiner

Primary Examiner — William C Vaughn, Jr.
Assistant Examiner — Eileen Adams
(74) Attorney, Agent, or Firm — Wolf, Greenfield & Sacks, P.C.

(57) ABSTRACT

Systems and methods described relate to a user to providing input to a computing device using eye tracking from a mobile position. A scene camera is mounted to the user so that the system collects image information related to where the user is looking. An indication is provided on a monitor of the computing device, or other field of view, to signify the presence and location of an identifying region of the monitor or field of view. An eye camera mounted to the user collects image information of the user's eye relating to a direction of gaze of the eye. When the direction of gaze of the user's tracked eye intersects the identifying region of the monitor or field of view, suitable eye tracking methods for controlling a computing device may be used to send instructions to the computing device.

20 Claims, 18 Drawing Sheets

MOBILE EYE TRACKING SYSTEM

BACKGROUND OF INVENTION

1. Field of Invention

This invention relates generally to systems and methods of eye tracking that enable a user to provide input to a computing device from a mobile position.

2. Discussion of Related Art

Eye tracking involves the measurement of the location of a point that falls within a direction of a gaze of an eye, i.e., where an eye is looking. For a number of eye tracking systems, a camera is mounted in an arrangement where the lens of the camera captures information regarding the position of a pupil of an eye. Images captured by the camera are analyzed and calibrations are made so as to provide a correlation between the image of the pupil of the eye and the direction of a gaze. In this respect, once the eye tracking system is calibrated, particular images of the pupil as captured by the camera will map to points in space at a location spaced from the person's eye.

When capturing images of the pupil, some eye tracking systems record images in the visible spectrum of light. However, when visible light is used in recording images of the eye, the occurrence of specular reflection may reduce accuracy. Therefore, eye tracking systems more frequently implement infrared imaging when recording images of the pupil so as to create a sharper contrast in the image between the pupil and the sclera portions of the eye.

Eye tracking can be useful for a number of applications. For example, people who are physically limited and unable to control a computer through usual movement (e.g., typing or moving a mouse with the hands) can use eye tracking systems to control a computer. An eye tracking system may involve a camera that is mounted adjacent to a monitor of a computer where a lens of the camera is directed toward an eye of the user who is positioned at a distance from the monitor. The camera uses infrared light to capture images of a pupil of an eye of the user. The head of the user must remain in a fixed position for the camera to capture video information of the user's eye. The location of the pupil of the eye captured from the camera is calibrated to a point on a screen of the monitor of the computer. When the system determines that the direction of the gaze of the eye falls on a screen of the monitor of the computer, the user is able to provide input to the computer by using certain actions of the eye. A typical control action may include moving a pointer displayed on the screen of the monitor by moving the direction of gaze of the eye around the screen. Another control action may be to blink the eye a particular number of times to select a particular object displayed on the screen. Looking at an object on the screen of the monitor for a predetermined period of time may also signify to the computer that the object at which one is looking is selected or highlighted. However, if the user physically moves to a different non-calibrated position relative to the screen, images of the eye recorded by the eye camera might no longer correspond accurately to points on the screen where the user is looking. Some systems attempt to deal with this problem by tracking the position of the face along with the eye, and correcting for the new position. In such systems that incorporate facial tracking along with eye tracking, the device captures a broad image of the user (i.e., the face and the eye), and as a result, the accuracy of such devices suffers, since the resolution of the captured images of the eye is reduced when the image captures a broader scene. The accuracy decreases even more as the position of the user's head moves farther away from the calibrated position.

Conventional eye tracking systems that involve methods for a user to control a computing device through movement of the eye are disclosed in U.S. Patent Publication No. 2009/0315827 entitled "Generation Of Graphical Feedback In A Computer System"; U.S. Patent Publication No. 200800284980 entitled "Eye Tracker Having An Extended Span Of Operating Distances"; U.S. Patent Publication No. 2009/0125849 entitled "Eye Tracker With Visual Feedback"; U.S. Patent Publication No. 2006/0109242 entitled "User Interface For Impaired Users"; U.S. Pat. No. 7,736,000 entitled "Method and Apparatus for Tracking Eye Movement"; U.S. Pat. No. 7,572,008 entitled "Method and Installation for Detecting and Following an eye and the Gaze Direction Thereof"; U.S. Pat. No. 6,637,883 entitled "Gaze Tracking System and Method"; U.S. Pat. No. 6,367,932 entitled "Apparatus And Method For Visual Field Testing"; U.S. Pat. No. 6,204,828 entitled "Integrated Gaze/Manual Cursor Positioning System"; U.S. Pat. No. 5,360,971 entitled "Apparatus And Method For Eye Tracking Interface"; and U.S. Pat. No. 4,950,069 entitled "Eye Movement Detector With Improved Calibration And Speed" all of which are incorporated herein by reference in their entirety.

SUMMARY

Aspects discussed herein relate to an eye tracking system that enables a user to provide input to a computing device while the user is in a mobile position. The computing device is associated with a field of view, such as a monitor, that has an identifying region marked by an indication such as one or more light signals. A first camera is mounted to the user and the lens of the first camera is positioned in a manner that faces away from the user so that the camera collects scene information generally associated with the field of view of the user. A second camera is mounted to the user and the lens of the second camera is positioned in a manner so as to be in close proximity to and face toward an eye of the user so that the camera collects image information of the eye. The system is calibrated such that a determination is made as to the direction of the gaze of the eye based on the image information collected of the eye by the second camera. Using the scene information as input, the system determines a location of the identifying region of the field of view. When the direction of the gaze of the user's eye tracked by the second camera is within the identifying region, input may subsequently be provided by the user through movements of the eye to the computing device. For example, using a monitor as the field of view, the user can look at the monitor of a computing device from a mobile position and provide input to the computing device through movement of the user's eye.

In one illustrative embodiment, an eye tracking system that provides input to a computer is provided. The system includes a computing device; a monitor coupled to the computing device, the monitor having an identifying region that is recognizable by an indication of the identifying region, wherein the computing device is programmed to recognize the indication of the identifying region; a first camera adapted to collect information related to a location of the identifying region of the monitor based on a location of the indication of the identifying region, the first camera being adapted to be mounted to a user such that a lens of the first camera faces away from the user; and a second camera having a lens that is adapted to be disposed in close proximity to and facing an eye of the user and being adapted to collect information from the eye of the user through the lens to provide an indication of a direction of gaze of the eye of the user, the information being provided as an input to the computing device.

In another illustrative embodiment, a method for providing computer input by tracking a direction of a gaze of an eye is provided. The method includes providing a computing device; providing a monitor of the computing device, the monitor having an indication marking an identifying region of the monitor; mounting a first camera to a user and positioning a lens of the first camera to face generally in a direction of the field of view of the user to collect scene information; mounting a second camera to the user and positioning a lens of the second camera to face toward an eye of the user to collect information relating to a direction of a gaze of an eye; using the scene information collected from the first camera to determine a location of the identifying region of the monitor; using the information collected from the second camera to determine the direction of the gaze of the eye; and providing input to the computing device based on the direction of the gaze of the eye.

In a further illustrative embodiment, at least one non-transitory computer storage medium comprising computer-executable instructions that, when executed by at least one processor, perform a method for calculating a location of a center of a pupil of an eye is provided. The method includes generating an image of a pupil of an eye comprising a distribution of pixels, each pixel having an intensity value and a geometric position on the image; selecting pixels having intensity values that fall within a defined range of intensity values; determining an average geometric position of the pixels having intensity values that fall within the defined range, the average geometric position being a first starting point for determining a location of a center of the pupil of the eye on the image; making measurements of a value of pixel intensity along lines extending in a plurality of directions away from the starting point; for each of the lines extending away from the starting point, determining a stop point, each stop point being determined based on a pixel intensity change exceeding a first threshold; for each stop point, making measurements of a value of pixel intensity along lines extending in a plurality of directions from the stop point back toward the starting point and at a plurality of points adjacent to the starting point; for each line from the stop point back to the starting point and a plurality of points adjacent to the starting point, defining a feature point having a geometric position, each feature point being determined based on a pixel intensity change exceeding second threshold; and averaging the geometric positions of the feature points to calculate a second starting point for determining the location of the center of the pupil of the eye on the image.

In yet another illustrative embodiment, a method for estimating a location of a center of a pupil of an eye from an image of the eye having pixels is provided. The method includes generating an image of a pupil of an eye comprising a distribution of pixels, each pixel having an intensity value and a geometric position on the image; selecting pixels having intensity values that fall within a defined range of intensity values; determining the geometric positions of the pixels having intensity values that fall within the defined range of intensity values; determining an average geometric position of the pixels having intensity values that fall within the defined range, the average geometric position being a first starting point for determining a location of a center of the pupil of the eye on the image; making measurements of a value of pixel intensity along lines extending in a plurality of directions away from the starting point; for each of the lines extending away from the starting point, determining a stop point, each stop point being determined based on a pixel intensity change exceeding a first threshold; for each stop point, making measurements of a value of pixel intensity along lines extending in a plurality of directions from the stop point back toward the starting point and at a plurality of points adjacent to the starting point; for each line from the stop point back to the starting point and a plurality of points adjacent to the starting point, defining a feature point having a geometric position, each feature point being determined based on a pixel intensity change exceeding a second threshold; and averaging the geometric positions of the feature points to calculate a second starting point for determining the location of the center of the pupil of the eye on the image.

In another illustrative embodiment, a mobile eye tracking system is provided. The system includes an identifying region of a field of view, the identifying region being recognizable by an indication; a computing device programmed to recognize the indication of the field of view; a first camera adapted to collect information related to a location of the identifying region of the field of view based on the indication of the identifying region, the first camera being adapted to be mounted to a user such that a lens of the first camera faces away from the user; and a second camera adapted to collect information through a lens from the eyes from which a direction of a gaze of an eye of the user may be determined, the lens being adapted to be disposed in close proximity to and facing an eye of the user, the information collected from the second camera being provided as an input to the computing device.

In yet another illustrative embodiment, a method for providing computer input based upon a direction of a gaze of an eye of a user is provided. The method includes providing an indication marking an identifying region of a field of view; mounting a first camera to the user and positioning a lens of the first camera to face away from the user to collect scene information; mounting a second camera to the user and positioning a lens of the second camera to face the eye of the user to collect information from the eye from which a direction of gaze of the eye may be determined; determining a location of the identifying region of the field of view from the indication based upon the scene information collected from the first camera; determining the direction of the gaze of the eye using the information collected from the second camera; and providing an input to the computing device based on a location of an intersection of the direction of the gaze of the eye and the identifying region of the field of view.

The foregoing is a non-limiting summary of the invention, which is defined by the attached claims. Other aspects, embodiments, features will become apparent from the following description. Each reference incorporated herein by reference is incorporated in its entirety. In cases of conflict or inconsistency between an incorporated reference and the present specification, the present specification will control.

BRIEF DESCRIPTION OF DRAWINGS

The accompanying drawings are not intended to be drawn to scale. In the drawings, each identical or nearly identical component that is illustrated in various figures is represented by a like descriptor. For purposes of clarity, not every component may be labeled in every drawing.

The advantages and features of this invention will be more clearly appreciated from the following detailed description, when taken in conjunction with the accompanying drawings, in which.

DETAILED DESCRIPTION

Figure 1A:
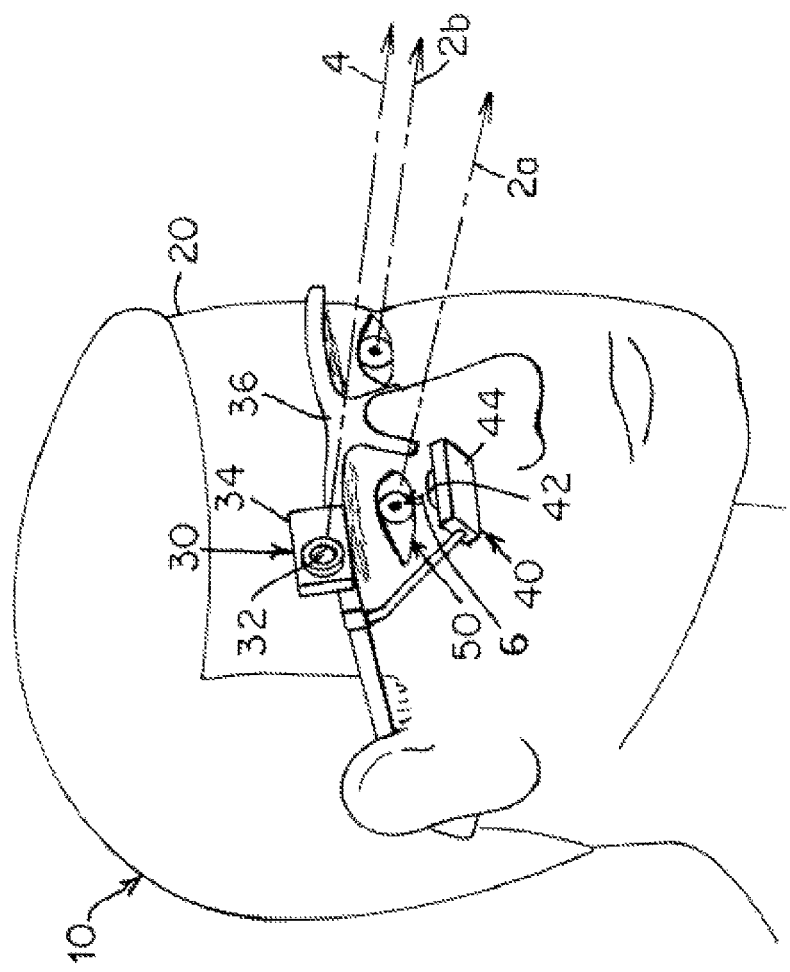
FIG. 1A is a schematic view of an embodiment of an eye-tracking device mounted on a user.

Aspects presented are not limited in their application to the details of construction and the arrangement of components set forth in the following description or illustrated in the drawings. Aspects herein are capable of other embodiments and of being practiced or of being carried out in various ways. Further, embodiments discussed may be used alone and/or in any suitable combination with any other aspect(s). Also, phraseology and terminology used herein are for the purpose of description and should not be regarded as limiting.

It has been recognized that conventional systems that enable a user to provide input to a computing device through tracking of movements of an eye of the user are ill-equipped for enabling the user to enter commands accurately to a computing device using eye tracking methods from multiple locations relative to a monitor of the computing device. In existing systems, once the user's eye is calibrated to control the computing device from one location, a user's movement to a different location relative to the monitor of the computing device typically requires the user's eye to be re-calibrated with respect to the physical location of the monitor of the computing device relative to the user to maintain eye tracking accuracy.

Aspects discussed herein relate to a system that utilizes eye tracking to enable a user to provide input to a computing device by a direction of gaze of the user's eye toward a field of view from any one of multiple of locations without the need to recalibrate the system whenever the user moves to a different location. Systems discussed herein further relate to implementation of eye tracking to enable a user to provide input to a computing device through successive interaction with a plurality of different fields of view that are associated with the computing device.

A field of view, as described herein, may be considered to be a region of space toward which a gaze of an eye of a user is directed for providing input to a computing device. For example, a field of view may be a monitor screen that is electrically coupled to the computing device where the direction of gaze of an eye of the user may point toward the monitor screen. In some cases, the direction of the gaze of the eye forms a point of intersection on the monitor screen that is within boundaries defined by an identifying region of the screen. Although for several embodiments described herein, a field of view is contemplated as a monitor screen, it should be appreciated that a field of view is not limited to a monitor screen and can apply to any suitable region toward which a gaze of an eye is directed for providing input to a computing device.

In some embodiments, a computing device may be coupled to a monitor having a screen where the user can provide instructions to the computing device by tracking movement of the user's eye in a particular manner. Depending on where the eye is looking with respect to the screen of the monitor and specific actions taken by the eye as tracked by the system, the user may provide instructions to the computing device.

A scene camera may be mounted to the user so that a lens of the scene camera faces away from the user to collect scene information generally relating to the direction in which the user is looking. From the collected scene information, the system may be configured to detect the presence of an identifying region of a monitor of a computing device to provide an indication to the system of a location within the scene information (e.g., a portion of a screen of the monitor) where the user may gaze to provide input to the computing device.

An eye camera is also mounted to the user so that a lens of the eye camera faces toward an eye of the user to collect information regarding the user's eye, for example, video images of the pupil of the eye. The system is calibrated such that images gathered of the user's eye provide an indication of the direction of the gaze of the eye (i.e., where the eye is looking). Calibration may be performed, for example, by correlating image information collected by the eye camera to when the user looks at points on a grid. By this calibration, a mapping is produced between images of the pupil of the eye and a direction of gaze of the eye. When the user looks at regions that lie between the points on the calibration grid, a suitable interpolation algorithm is employed to accurately determine a direction of the gaze of the eye. Accordingly, when the user is looking at a particular portion of a screen on the monitor of the computing device, input signals are transmitted to the computing device by detection of where the user is looking on the screen of the monitor and what commands may be indicated by the user to the computing device through action (or inaction) of the eye.

A camera, such as a scene camera or an eye camera as described herein, may be any device that is capable of or adapted to receive and transmit an image.

In a conventional eye tracking system, if the user provides eye tracking input to a computing device and then moves to a different physical location, the direction of gaze of the user's eye would no longer be accurate with respect to the monitor and, accordingly, the user would have to go through a re-calibration process, lest additional sources of error be introduced to the system. A re-calibration process may be extremely time consuming as the user is required, again, to look at different physical points (e.g., a grid) on a screen while the system correlates image information of the pupil of the eye with the physical points on the screen that are being looked at. However, in systems described herein, if the user moves to a different physical location relative to the monitor, the system still provides the ability for the user to present instructions to the computing device using eye tracking control without having to undergo a tedious re-calibration process of correlating image information of the eye with locations where the eye is looking.

Through image information collected by the scene camera, the system may determine the location of a screen of the computing device based on detection of an identifying region of the monitor of the computing device. By detecting the screen of the computing device, the system may automatically account for the change in the user's physical location. That is, once the system determines the location of the screen of the computing device, the system tracks movement of an eye of the user in a manner that appropriately provides instructions to the computing device when the user is looking at the screen.

In one embodiment, a computing device has multiple monitors where each monitor has an identifying region to indicate the location of a screen on the monitor. A scene camera is mounted to the user for collecting scene information for the system to determine the location of a screen of one of the monitors via detection of a corresponding identifying region. Once the location of the screen is determined, the user provides input to the computing device using suitable eye tracking commands. The user is also able to look away from the first screen of the computing device and toward a different screen of the same computing device and provide computer input with appropriate eye tracking commands. In this regard, the scene camera provides scene information to the system so as to detect the presence of a corresponding identifying region of a different monitor that signifies the presence of the different screen. As such, input control to the computing device through the first screen is shifted to input control to the computing device through the screen of the other monitor. For example, a conventional binary search protocol could be implemented to enable a user to look away from one screen of the computing device and toward another screen when providing input to the computing device. In such an implementation, described further below, LEDs of the monitors can be turned on and off to identify a current monitor at which the user is looking.

An identifying region of a field of view, for example on a monitor, may be recognizable by an indication on or near the field of view that may include any suitable marking and/or signal that signifies the presence of the field of view through which eye tracking input is provided. For example, an indication may include one or more signals arranged in a pattern in which the signals are emitted by a device such as a light emitting diode (LED). In some embodiments, an identifying region includes signal emissions that originate from a number of locations on a boundary of the field of view. In one embodiment, an identifying region includes an indication provided by infrared signals emitted by LEDs that are positioned at four corners of a screen of the monitor. It should be appreciated that an indication of an identifying region need not include a signal, such as light emitted from LEDs. In another embodiment, a region having contrasting colors may be an indication of an identifying region of a field of view. For example, an indication of an identifying region may include a black circle in a white square, or a white circle in a black square. Indeed, any suitable indication of an identifying region may be employed that permits a computing device to determine the location of a field of view from scene image input.

Turning to the figures, FIG. 1A depicts an illustrative schematic of a user 10 in which a scene camera 30 and an eye camera 40 are mounted to the user's head 20. The lens 32 of the scene camera 30 is directed away from the user's head 20 in a direction 4 so as to capture scene information while the lens 42 of the eye camera 40 is directed toward the user's eye 50 in a direction 6 to capture information about the position of the eye which is related to the direction 2a in which the eye is looking. The eye camera 40 is mounted in close proximity to the user's eye 50 so as to capture image information of the eye as accurately as possible. Suitable cameras that may be used for a scene camera or an eye camera include, for example, web cameras, mini-cameras, portable camcorders, or other small digital image collection devices.

Figure 1B:
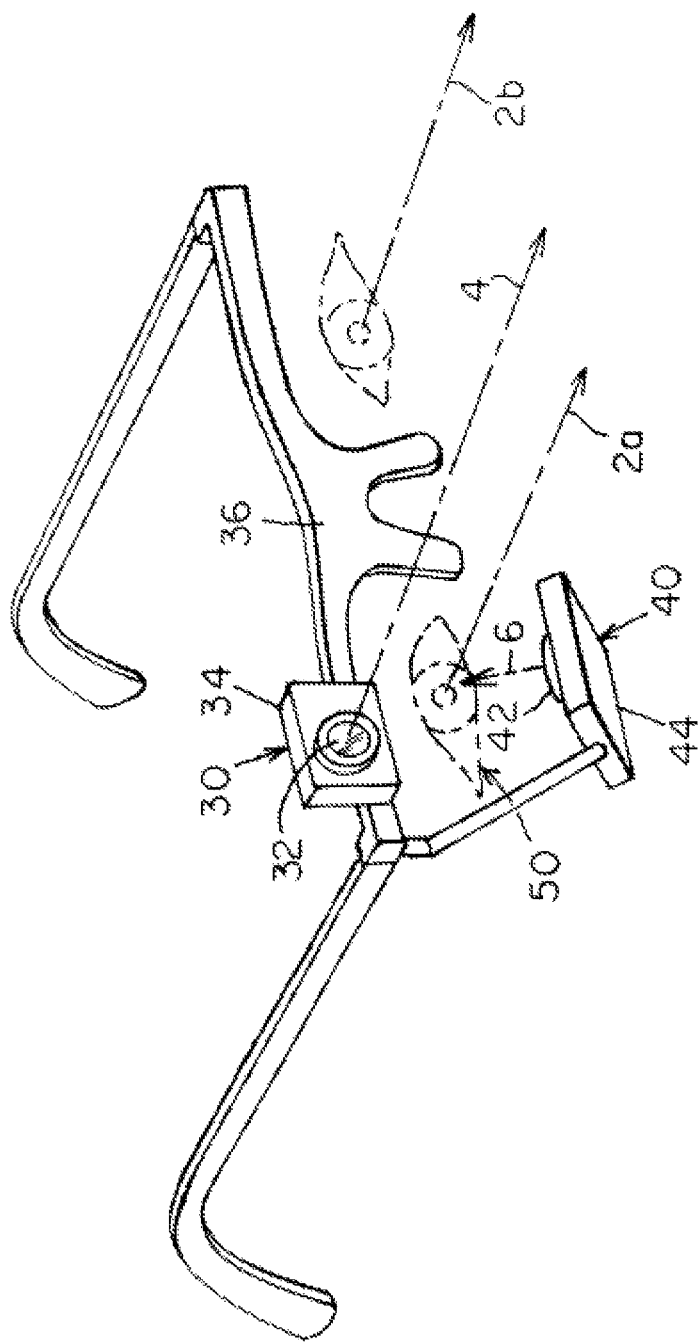
FIG. 1B is a perspective view of an embodiment of an eye-tracking device.

FIG. 1B shows an illustrative embodiment of a mounting device for attaching a scene camera 30 and an eye camera 40 together on a user's head. Scene camera 30 includes a lens 32 and a camera body 34 that contains suitable electronics for transmitting scene information collected by the lens 32 to appropriate portions of the eye tracking system. Similarly, eye camera 40 includes a lens 42 and a camera body 44 in which electronics on the camera transfer images of an eye gathered by the lens 42 to the eye tracking system. When mounted, the device provides positioning for the eye camera 40 to be located in close proximity to the eye of the user. A mounting frame 36 permits the two cameras to be mounted to the head of the user so that the cameras are placed in a suitable position for collecting image data.

Appropriate frames of a mounting device may include a structure that is similar to safety glasses with a significant portion of the plastic lens cut out. Though mounting frames are not limited in this regard, such a structure may provide stability and flexibility without undue reflection. In some embodiments, some plastic may remain (or may be added) near edges of the frame to support the structure of the frame. Scene camera 30 and eye camera 40 may be mounted to frame 36 by any appropriate method, for example, through use of an adhesive, a fastener or other securing device. An adjustable strap (e.g., made of rubber, cloth, plastic, etc.) that preferably contains an elastic material may be included with the mounting frame to minimize slippage of the device when mounted to the head of the user.

Figure 2:
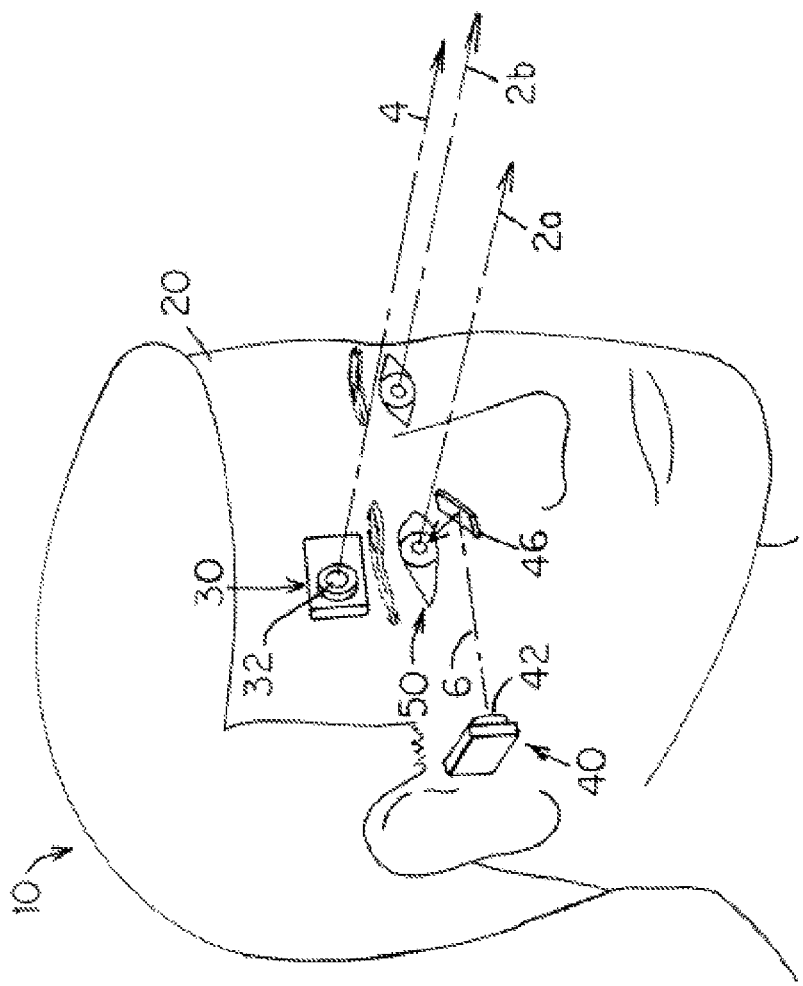
FIG. 2 is a schematic view of another embodiment of an eye-tracking device mounted on a user.

In some embodiments, and as illustrated in FIG. 2, a mirror 46 may be mounted to the head 20 of the user, sometimes referred to as a hot mirror, and is used to reflect radiation from the eye to the eye camera at an angle (e.g., 45 degrees) that provides flexibility for how and where an eye camera is mounted. The mirror may be placed above or below the eye. The mirror enables the camera to capture images of the eye reflections of radiation (e.g., infrared light) off of the mirror. In this embodiment, the eye camera 40 may be positioned to face a direction 6 to capture images of the eye and in such a way that the camera does not interfere with the user's field of vision. A small mirror, when positioned near the eye, is less visually occluding than a camera. In embodiments where a mirror is included, the mirror may be attached to a mounting frame 36 of the device by, for example, through use of an adhesive, a fastener or other securing device.

An eye camera or a mirror is disposed in close proximity to an eye 50 of the user so as to gather image information regarding the position of the pupil of the eye as accurately as possible. Appropriate processing of the image information enables the system, when calibrated, to determine the direction where the eye is looking, i.e., the direction of the gaze of the eye. In some embodiments, the direction of the gaze of the eye on an image is more easily estimated when the location of the center of the pupil of the eye is determined. Any suitable algorithm may be used for determining the location of the center of the pupil of the eye on an image of the eye.

Figure 3B:
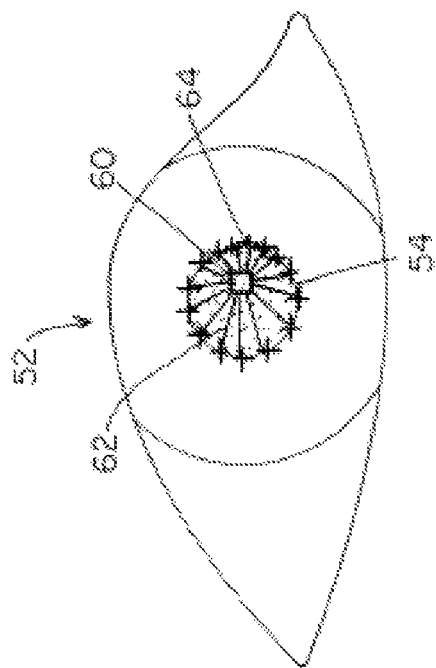
FIG. 3B is the infrared image of the eye of FIG. 3A showing a plurality of measurements being made from a starting point on the image to stop points along the pupil of the eye.
Figure 3A:
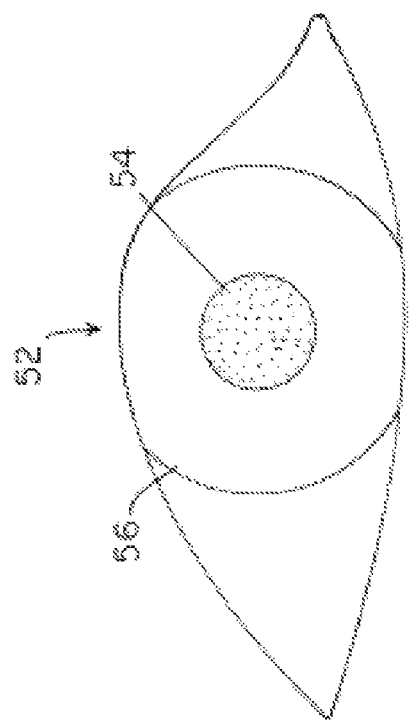
FIG. 3A is an infrared image of an eye of a user.
Figure 3D:
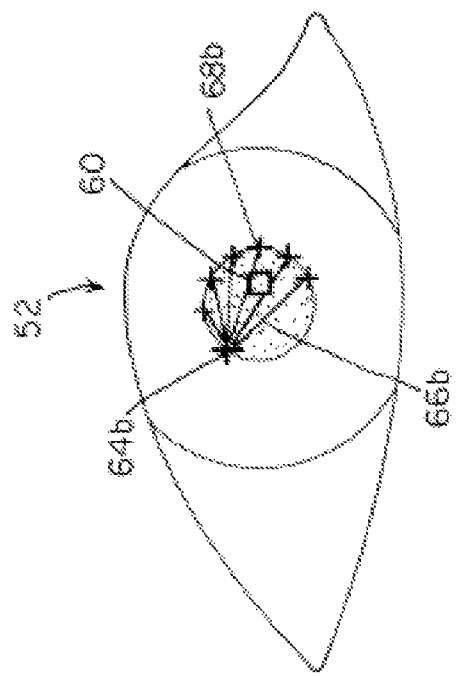
FIG. 3D is the infrared image of the eye of FIG. 3A showing a plurality of measurements being made from another stop point of FIG. 3B along the pupil of the eye back toward the starting point.
Figure 3C:
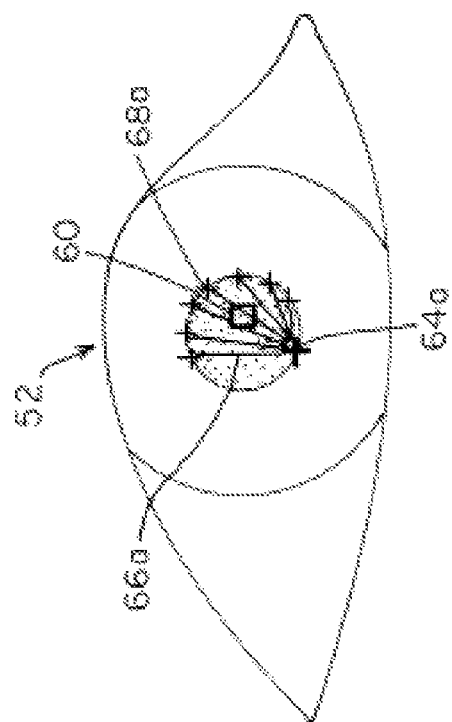
FIG. 3C is the infrared image of the eye of FIG. 3A showing a plurality of measurements being made from a stop point of FIG. 3B along the pupil of the eye back toward the starting point.
Figure 3F:
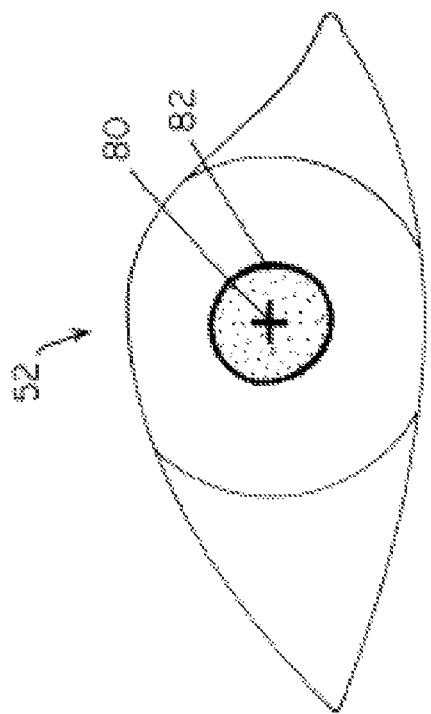
FIG. 3F is the infrared image of the eye of FIG. 3A illustrating an ellipse fit to the feature points of FIG. 3E.
Figure 3E:
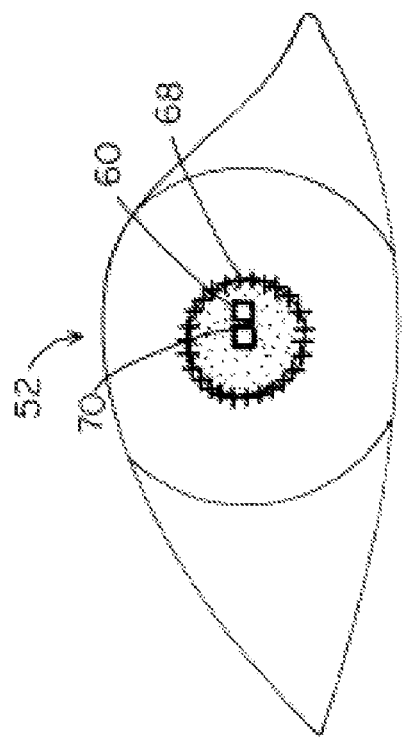
FIG. 3E is the infrared image of the eye of FIG. 3A illustrating feature points that define the edge of the pupil of the eye.
Figure 3G:
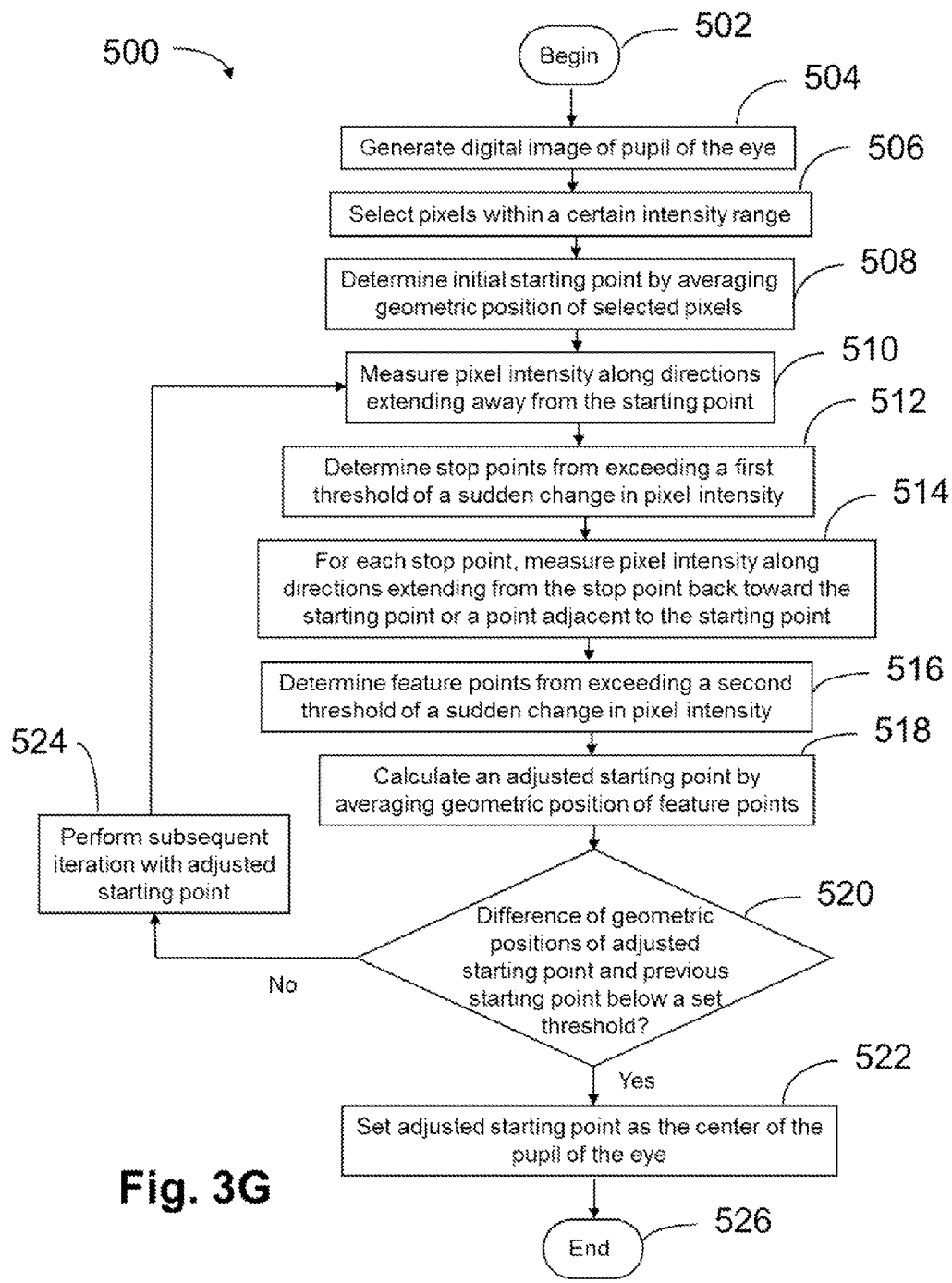
FIG. 3G is a block diagram flowchart of an algorithm for estimating the center of the pupil of an eye from a digital image of the eye.

FIGS. 3A-3G describe another aspect described herein of an algorithm 500 that may be used to estimate the center of the pupil of an eye. According to the flowchart of FIG. 3G and the images of FIGS. 3A-3F, an image 52 of an eye is generated 504 from a digital rendering based on detection of infrared radiation from an eye camera disposed in close proximity to the eye. Based on the digital image rendering, image 52 is stored in a digital format having pixels. FIG. 3A depicts the image 52 showing the pupil 54 of the eye and the sclera 56 of the eye. Image 52 is stored in a digital format having a distribution of pixels where each pixel is assigned a number that describes the level of brightness intensity of the image. Each pixel is also assigned a unique geometric position on the image. For example, pixels that are located in the region of the image that generally represents the pupil 54 of the eye, due to being quite dark, have an intensity value that is generally lower than pixels that are located in the region of the image that generally represents the sclera 52 of the eye. It can be appreciated that pixels of an image can have intensity values that fall within any suitable range. For example, intensity values of pixels for some images fall within a range of 256, 512 or 1024. Process steps are illustrated in FIGS. 3B-3F of a suitable algorithm that can be used for estimating the location on the infrared image of the center of the pupil of an eye. FIG. 3G provides a block diagram of the process flow of the algorithm 500 depicted in FIGS. 3B-3F from when the system is first initiated 502 to when the center of the pupil of the eye is finally estimated 526. In estimating the location of the center of the pupil of the eye, a starting point is first determined, preferably within the pupil region 54. As discussed above, since the image 52 was produced under infrared radiation, the portion of the image that represents the pupil 54 generally contains the pixels having the darkest intensity values of the image. Therefore, the starting point is determined according to locations on the image having the darkest pixels. Accordingly, the geometric positions of pixels having intensities that fall within a defined range of intensity 506 that represent dark values of brightness intensity are first considered for a starting point. Once pixels having brightness intensity values that fall within the defined range are determined, the geometric positions of those pixels are averaged. The average of the geometric positions of the pixels having dark intensity values according to the defined range results in the starting point 508 for estimating the location of the center of the pupil of the eye on the digital image. It should be understood that any defined range of brightness intensity values may be used. In some embodiments, the defined range of brightness intensity values is according to the darkest 10% of all brightness intensity values for pixels on the image. For example, in estimating the starting point for the location of the center of the pupil, the geometric positions of the pixels having intensities that are within the top 10% of the darkest intensities are averaged to yield the first starting point.

Once a starting point for the algorithm is determined, as shown in FIG. 3B, measurements of intensity values are made 510 of pixels along multiple lines 62 that extend in a plurality of directions around and away from the starting point 60. Derivatives are also measured at each pixel along lines 62 to determine the change of intensity values in a particular direction at each geometric point. For each of the lines of measurements that extend away from the starting point 60, a series of stop points 64 are determined 512 based on a change in pixel brightness intensity, or a derivative value, that exceeds a first threshold. For example, such a change may include a recorded decrease, or calculated negative derivative of pixel intensity that exceeds the first threshold. Alternatively, the change may include an increase, or calculated positive derivative of pixel intensity. It can be appreciated that the threshold for the measure of change where stop points are determined can fall within any suitable range. In some embodiments, this threshold may include a changing pixel intensity of at least about 5%. In some embodiments, this threshold may include a change in pixel intensity that falls within a range of between 10 and 30 brightness intensity values. FIG. 3B illustrates a locus of stop points 64 determined around the edge of pupil 54 for measurements that are made along lines 62 that completely surround starting point 60.

When a locus of stop points 64 is determined, for each stop point, measurements are made 514 as to the value of pixel intensity along lines that extend in a number of directions from the stop point back toward the starting point 60 and toward a plurality of points adjacent to the starting point. In some embodiments, measurements are made of brightness intensity values along lines that span an arc about the starting point 60. For example, measurements can be made of intensity values along lines that span an arc of 30 degrees where lines at the boundaries of the arc form an angle of 15 degrees with a line that passes from the corresponding stop point directly through the starting point 60. It can be appreciated that lines along which measurements are made of intensity values from a stop point toward points adjacent to the starting point may span any suitable arc.

For each line of measurements from the corresponding stop point back to the starting point and the plurality of points adjacent to the starting point, a series of feature points are determined 516 based on a change in pixel intensity, or derivative, exceeding a second threshold. It can be appreciated that the threshold for the measure of change where feature points are determined can fall within any suitable range. In some embodiments, this threshold may be similar to that of the first threshold for determining stop points. For example, the second threshold may include a changing pixel intensity of at least about 5%. In some embodiments, this threshold may include a change in pixel intensity that falls within a range of between 10 and 30 brightness intensity units. As described above with respect to the first threshold, a change may include a recorded decrease, or calculated negative derivative of pixel intensity that exceeds the second threshold, or, a recorded increase, or calculated positive derivative, of pixel intensity.

FIGS. 3C and 3D illustrate two examples where a plurality of feature points are determined. In FIGS. 3C and 3D, respectively, measurements are made from stop points 64a and 64b along a plurality of lines 66a and 66b back toward starting point 60 and regions adjacent to starting point 60 where feature points 68a and 68b are determined by a change in pixel intensity value exceeding the second threshold. As illustrated, the plurality of lines 66a and 66b span an arc of approximately 30 degrees. Measurements made from stop points 64a and 64b as illustrated in FIGS. 3C and 3D are by way of example, as for some embodiments, measurements are made from every stop point in the locus of stop points 64 which is depicted in FIG. 3B.

Once feature points 68 are determined, geometric positions of the feature points are averaged to calculate a second starting point 518 for estimating the location of the center of the pupil of the eye on the image. FIG. 3E depicts feature points 68 where the average of the geometric positions of those feature points yields second starting point 70. As illustrated, second starting point 70 appears to be closer to where the center of the pupil of the eye is located than the first starting point 60.

Once the second starting point is determined, the above steps of defining feature points can be repeated to yield another starting point. That is, using the subsequent starting point, measurements can be made of pixel intensity along lines extending outward from the subsequent starting point, in directions surrounding the subsequent starting point, to determine a locus of subsequent stop points based on the first threshold calculation. Measurements can also be made of pixel intensity along lines extending from each subsequent stop point back toward the subsequent starting point and points adjacent to the subsequent starting point to determine a locus of subsequent feature points based on the second threshold calculation. The geometric positions of the subsequent feature points are averaged to determine a next starting point in estimating the location of the center of the pupil of the eye on the image.

The process of calculating subsequent starting points may be repeated until convergence of the starting point ensues, that is, until the difference between geometric positions of a starting point in relation to a subsequent starting point is less than a certain threshold. In other words, the system determines whether the difference of the geometric positions of the adjusted starting point and the previous starting point is below a set threshold 520. If the difference is below the set threshold, then the adjusted starting point is estimated to be the center of the pupil of the eye 522. However, if the difference is not below the set threshold, then a subsequent iteration is performed using the adjusted point as the starting point 524. In some embodiments, convergence of starting points occurs when the difference between geometric positions of starting points calculated from subsequent iterations is about 1% or less. In some instances, the speed and/or accuracy of the algorithm will depend on how small the set threshold is. For example, a larger set threshold will generally result in a faster, yet less accurate, determination of the center of the pupil of the eye. Conversely, a smaller set threshold will generally result in a more accurate, yet slower, determination of the center of the pupil of the eye.

In an embodiment, convergence is determined to occur when the distance between starting points is no greater than 1% of the width plus the height of a small image of the pupil of the eye, otherwise known to those of ordinary skill as a block-wise Manhattan distance. The small image of the pupil of the eye is taken as a smaller subset of the larger recorded image of the eye. For instance, for an image subset where the pupil of the eye is captured to be within a 100×100 pixel image, in this embodiment, the threshold convergence radius is 2 pixels, that is, convergence between starting points is determined to occur if the starting point from one iteration to the next is displaced a distance of 2 pixels or less.

In some embodiments, averaging the geometric positions of the plurality of feature points to determine a subsequent starting point includes averaging the geometric positions of all feature points that have been accumulated for every iteration of the algorithm. In other embodiments, averaging the geometric positions of the plurality of feature points to determine a subsequent starting point includes averaging the geometric positions only of feature points that are determined only for a current iteration of the algorithm.

When convergence of starting points in the above described algorithm has occurred, feature points are fitted to an ellipse. For example, FIG. 3F depicts an ellipse 82 that is determined through fitting of a final set of feature points such as feature points 68 depicted in FIG. 3E. Once ellipse 82 is calculated, the location of the center of the ellipse is determined to be geometrically coincident with the center 80 of the pupil of the eye.

To calculate the direction of the gaze of the eye in a scene image, a mapping is constructed between images collected of the eye from the eye camera and scene information collected by the scene camera. Such a mapping can be built by forming a relationship between known eye positions as determined by images of the eye to known locations on a scene image. For example, the direction of where an eye is looking on a known pattern or arrangement (scene image) can be calibrated with the location on an image of the center of the pupil of the eye. A system and method for performing a calibration mapping that maps a pupil location to a corresponding scene image is illustrated in U.S. Pat. No. 7,736,000 entitled "Method and Apparatus for Tracking Eye Movement."

Dynamic methods of mapping an image of a pupil of an eye to a direction of gaze of the eye may also be conducted. For example, during a calibration process, the user may look at a target (e.g., cursor) that is located at an initial position and moves to various positions across a screen. For each position of the target on the screen, the system correlates the information gathered from the image of the pupil of the eye with the location of target. Systems and methods for calibrating an image information of a pupil of an eye with one or more moving targets are described in U.S. Pat. No. 6,637,883 entitled "Gaze Tracking System and Method" and U.S. Pat. No. 6,367,932 entitled "Apparatus and Method for Visual Field Testing."

Figure 4:
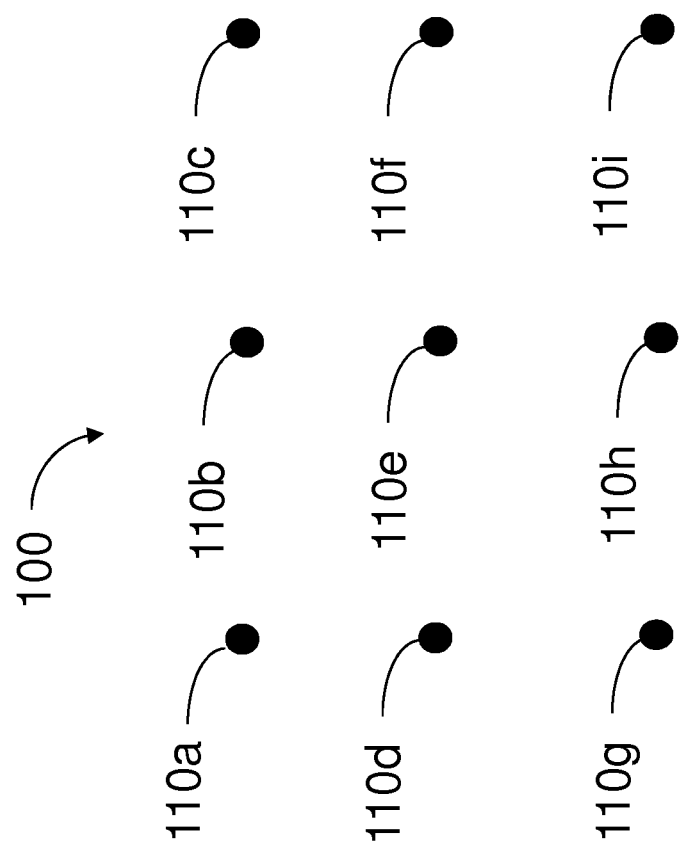
FIG. 4 is a schematic view of a calibration grid for a spatial direction of a gaze of an eye.

FIG. 4 depicts an example in which a grid 100 has nine points 110a, 110b, 110c, 110d, 110e, 110, 110g, 110h and 110i with which the eye tracking system may be calibrated. Image information collected by an eye camera regarding the location of the center of the pupil of the eye may be correlated with the grid 100. Accordingly, when calibrating, the user looks at a first point 110a on the grid 100 while the eye camera collects an image of the eye and the system determines the location of the center of the pupil of the eye on the image of the eye. A relationship is then established between the image of the eye and the direction in which the eye is looking at point 110a. A similar process for the other points on the grid 100 as for point 110a then ensues. It can be appreciated that any pattern or arrangement may be used for the system to calibrate the direction where an eye is looking with an image of the eye. In some cases, a pattern having a greater number of calibration points may provide for a higher degree of accuracy.

In some embodiments, image information regarding the location of the center of the pupil of the eye is mapped to spatial coordinates in front of a user, that are in between the calibrated "grid" points, using an appropriate interpolation scheme. Thus, having already performed calibration steps with a grid, any suitable interpolation scheme between points on the grid may be employed, for example, linear, quadratic and/or cubic interpolation schemes.

While the direction of the gaze of the eye can be determined through analysis of images collected from the eye camera, the system provides for communication to a computing device from a mobile position by mapping the direction of the gaze of the eye to a screen on a monitor of the computing device. Accordingly, the scene camera collects scene image information and based on the scene image(s), the system determines the presence and location of a portion of a screen of a computing device to which the user will provide eye tracking input.

Screen detection on a scene image may occur through any suitable method. An indication may be located on or near a portion of a screen of a monitor by inclusion of an identifying region. Accordingly, by detecting the identifying region, the screen may be recognized on a scene image by the system. The indication may provide detection of an identifying region in the form of an appropriate signal.

In an embodiment, the indication of the identifying region of the screen may be a set of infrared LEDs that are attached to four corners of the monitor of the computing device. Infrared LEDs may be used as the indication of the identifying region, since such LEDs will likely be the brightest source of infrared illumination on scene images. As infrared LEDs are used, a binary filter may be applied to intensity values within a certain percentage (e.g., 10%) of the brightest infrared value. For each pixel on a digital image, if the intensity level at a particular point is within the predetermined percentage, then a one is registered, otherwise a zero is registered for that pixel. Contiguous clusters of ones are grouped together and the geometric center and volume of the cluster are calculated. When infrared LEDs are used as indications for corners of the identifying region, the four points that are closest in volume to one another are used as the four corners of the identifying region. The four corners signified by LED signals are then assigned positions of actual corners of the screen of the monitor. For example, the LED closest to the upper left corner of a scene image is determined to be the upper left corner of the screen, and similarly for the other corners. In some embodiments, detection of the identifying region occurs through an adaptive thresholding technique which allows for different thresholds to be used for different regions in the image. Infrared LEDs may be coupled with a resistor so as to reduce current through the LED to ensure that the light intensity projected from the LED is not harmful. It can be appreciated that any suitable indicator can be used to provide an indication to the system having scene video images of an identifying region.

Figure 5:
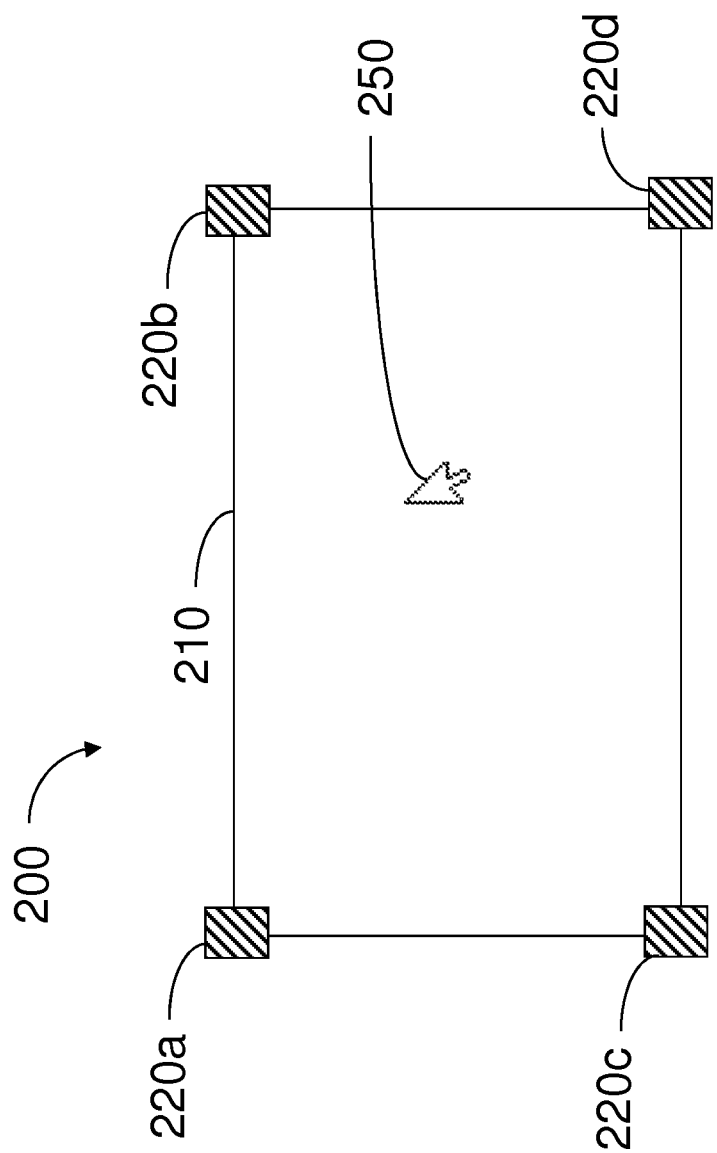
FIG. 5 is a schematic view of a monitor having signal indicia disposed on corners of a screen of the monitor defining an identifying region.

FIG. 5 depicts an illustrative embodiment of a monitor 200 having a screen 210 where an identifying region of the monitor is defined by signals 220a, 220b, 220c, and 220d. Displayed on the screen of the monitor is a pointer 250 that serves to provide a method for a user to present instructions to the computing device. In some embodiments, the pointer 250 moves to whatever position the user looks at on the screen 210. The scene camera gathers video images of scene information and the system analyzes the scene video images to determine whether an identifying region can be found in the images. For a particular set of video images, once an identifying region is detected by the system, the location of the screen through which the user is able to provide input to the computing device is determined. It can be appreciated that any image analysis system may be used to analyze scene video for the eye tracking system. Although it should be understood that embodiments herein are not so limited, exemplary image analysis software may be created using C# and run on a computer connected to both the scene and eye cameras for retrieving scene and eye image information. The C# programming language may be useful due to its portability and computing speed. Any other suitable programming language can be used, such as, for example, the C++ programming language. In some cases, the code may be compiled to native binaries which can result in a runtime that is several orders of magnitude faster than what the runtime would be using equivalent code in an interpreted language (e.g., MATLAB, Python or Ruby).

Accordingly, when the direction of the gaze of the eye, calibrated by images collected from the eye camera, falls within the identifying region defined by the signals 220a, 220b, 220c, and 220d, the system enables the user to provide instructions to the computing device using an appropriate eye tracking command interface. For example, a user may control the position of a pointer and select different icons on the screen through simple actions of the eye. In an embodiment, when the user fixes his/her gaze on a particular activation region (e.g., action button) on a screen, the user may provide input to the system (e.g., selecting or clicking on the action button) by performing a blinking action. In another embodiment, input to the system may be provided when the user fixes his/her gaze on an activation region on a screen for a specified dwell time. Systems and methods that provide an interface that allow for a user to provide instructions to a computing device through movements of the eye are described in U.S. Pat. No. 6,637,883 entitled "Gaze Tracking System and Method" and U.S. Patent Publication No. 2009/0125849 entitled "Eye Tracker with Visual Feedback."

In some embodiments, when the direction of the gaze falls outside of the boundaries of the identifying region, the ability for the user to provide on screen input to the computing device through the eye tracking command interface is temporarily disabled. However, it can be appreciated that the user may still be able to provide input to the computing device when the direction of the gaze of the eye falls outside of the boundaries defined by the identifying region.

Figure 6:
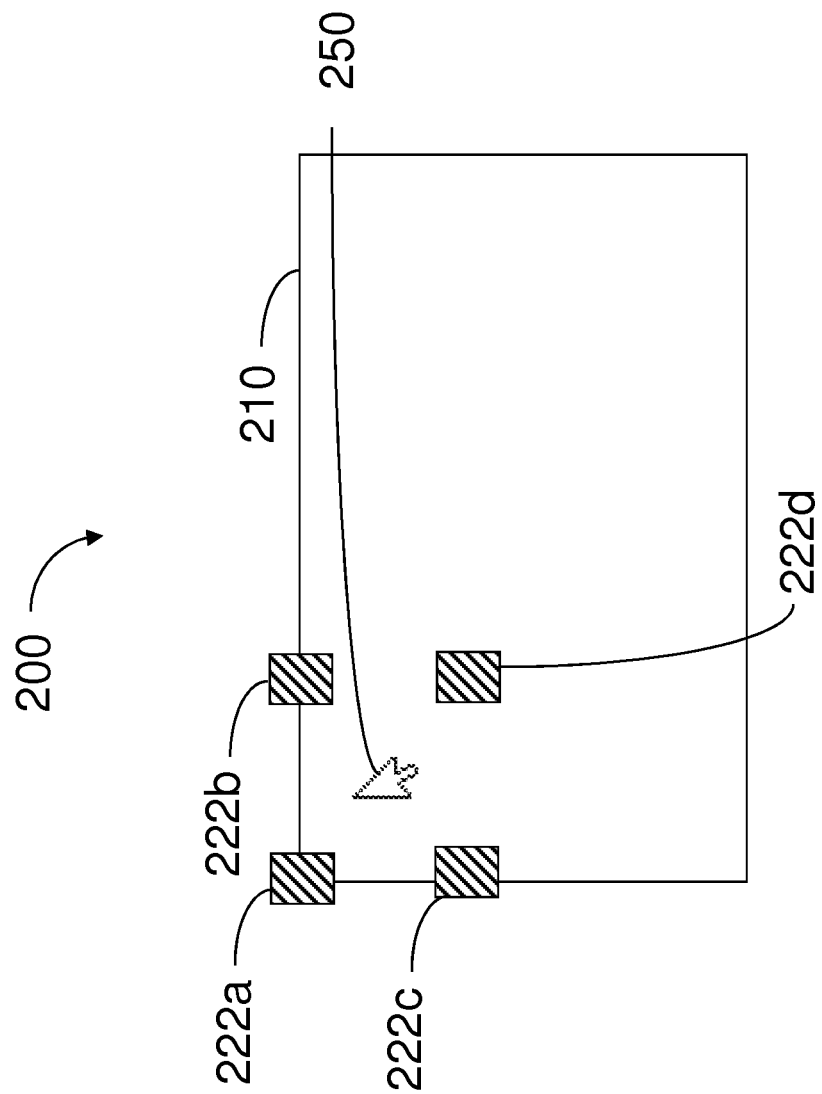
FIG. 6 is a schematic view of a monitor having signal indicia disposed on corners of a portion of a screen of the monitor defining another identifying region.

In some cases, an identifying region may define only a portion of a screen of a monitor for a user to interact with using an eye tracking command interface when the direction of user's gaze falls within the boundaries of the identifying region. FIG. 6 depicts an illustrative embodiment of a monitor 200 having a screen 210 where an identifying region of the monitor defines only a portion of the screen with signals 222a, 222b, 222c, and 222d. Therefore, when the direction of the gaze of the eye falls within the identifying region defined by the signals 222a, 222b, 222c, and 222d, the user is enabled to provide instructions to the computing device using an appropriate eye tracking command interface. In some embodiments, when the direction of the gaze falls outside of the boundaries of the identifying region, even when the direction of gaze still falls within the screen 210, the user is temporarily unable to provide certain on screen input (e.g., movement of a mouse pointer) to the computing device through the eye tracking command interface. However, when the direction of the gaze of the eye falls within the boundaries of the identifying region, the user is, again, enabled to provide appropriate eye tracking input.

Figure 7:
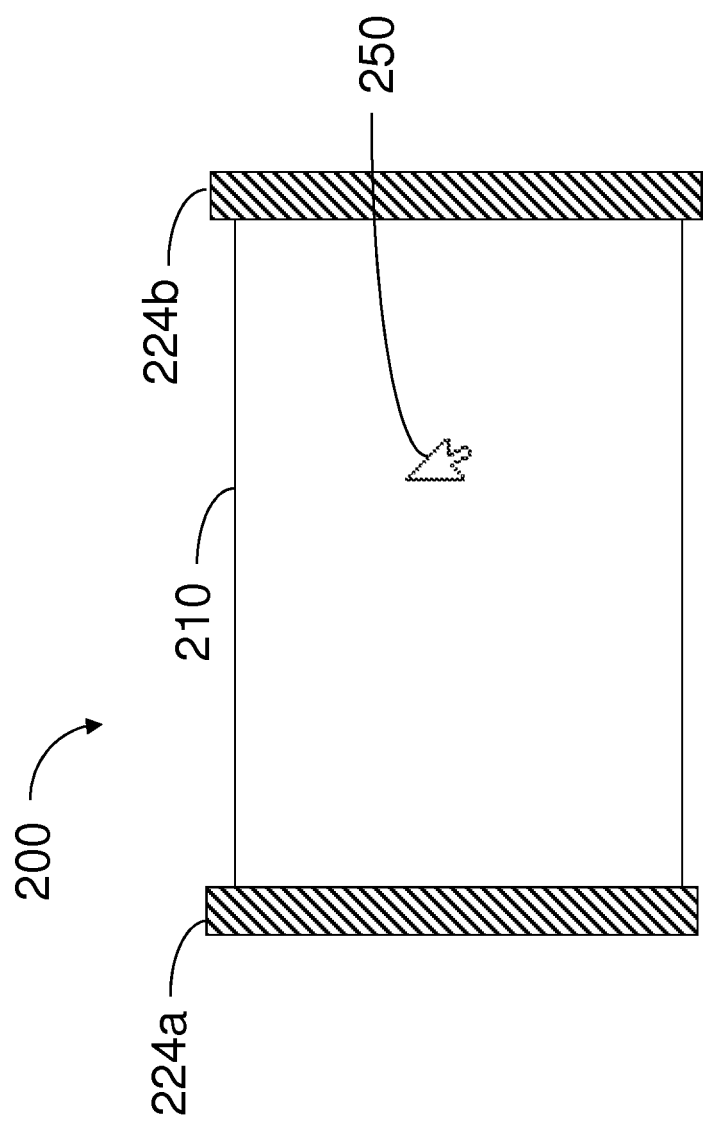
FIG. 7 is a schematic view of a monitor having signal indicia disposed on edges of the monitor defining yet another identifying region.

It can be appreciated that an identifying region can include any suitable pattern and is not required to be a grid. FIG. 7 depicts an illustrative embodiment of a monitor 200 having a screen 210 where an identifying region of the monitor is defined by two boundary signals 224a and 224b. Thus, when the direction of the gaze of the eye falls within the identifying region defined by the signals 224a and 224b, the user can provide instructions to the computing device using the eye tracking command interface.

In some embodiments, the user is able to control, through an eye tracking interface, a computing device that has multiple monitors. In this regard, the user can provide instructions to the computing device through a first monitor when the direction of the gaze of the user's eye falls within the identifying region of the screen of the first monitor. At any moment, the user can shift his/her view to a second monitor such that the direction of the gaze of the user's eye falls within the identifying region of the screen of the second monitor, and thus, the user is enabled to provide instructions to the computing device using eye tracking interface through the second monitor.

When multiple monitors are used, a suitable algorithm can be employed for the system to track when the direction of gaze of the user's eye falls within the identifying region of one monitor as opposed to another. In an embodiment, an algorithm that is employed may include a check to determine whether the direction of gaze falls within identifying regions of monitors that are characterized by particular patterns or sets of dimensions of how indicators are positioned on the monitors. For example, the identifying region of one monitor may have a different set of dimensions as compared to that of another monitor, which is accounted for by the algorithm. When the direction of gaze falls within an identifying region having indicators uniquely positioned so as to identify a first monitor, then the user is enabled to provide input to a computing device through the first monitor. Similarly, for providing instructions to a computing device through a second monitor that has indicators specifically positioned to identify the second monitor. When the direction of gaze does not fall within indicators of a pre-known identifying region of a monitor, then input signals are unable to be sent through either monitor via eye tracked movement.

In another exemplary algorithm to track when a direction of gaze falls within an identifying region of a monitor in a multiple-monitor system, the system may check whether the gaze of the eye passes through a border region of an identifying region. In this regard, the algorithm implements a binary scheme that records whether the gaze of the eye falls within an identifying region or not. When the system initially determines that the gaze of the eye does not fall within an identifying region, and the gaze of the eye passes through a designated border of an identifying region (determined by the position of indicators on the monitor), then the system provides a positive indication of the gaze of the eye falling within the identifying region of a monitor so as to enable a user to send instructions to a computing device through that monitor. When the gaze of the eye subsequently passes through a designated border and out of the identifying region, the system provides a negative indication of the gaze of the eye falling within the identifying region of the monitor, disallowing instruction signals to be sent to the computing device through the monitor. In one example, the system determines when the user has shifted his/her direction of gaze to another monitor by comparing the positions of the LED signals in the current frame with those of a previous frame. Whenever there is a substantial change in position(s) of the LEDs, the system may execute a binary search on each of the monitors associated with the system to determine which monitor is currently in view. As an example, four monitors may be set up in the following manner:

1 2
3 4

The system would first turn off all of the LEDs identifying monitors on the left, that is, monitors 1 and 3. If the system still detects LEDs in the scene camera, then the system recognizes that the user is looking at either one of monitors 2 or 4 (on the right side). The system then would turn off the LEDs on the right side that are in the top half, i.e., those LEDs associated with monitor 2. If LED signals are still detected, the system would determine that the user is looking at monitor 4. If there are no LED signals detected, the system would determine the user is looking at monitor 2. Such a method can be applied to any suitable arrangement of monitors.

In some embodiments, multiple monitors may correspond to multiple computing devices. For example, a user can provide instructions to a first computing device through a first monitor when the direction of the gaze of the user's eye falls within the identifying region of the screen of the first monitor. When the user shifts his/her view to a second monitor of a second computing device such that the direction of the gaze of the user's eye falls within the identifying region of the screen of the second monitor, the user is enabled to provide instructions to the second computing device using an eye tracking interface through the second monitor, rather than the first computing device.

Figure 8A:
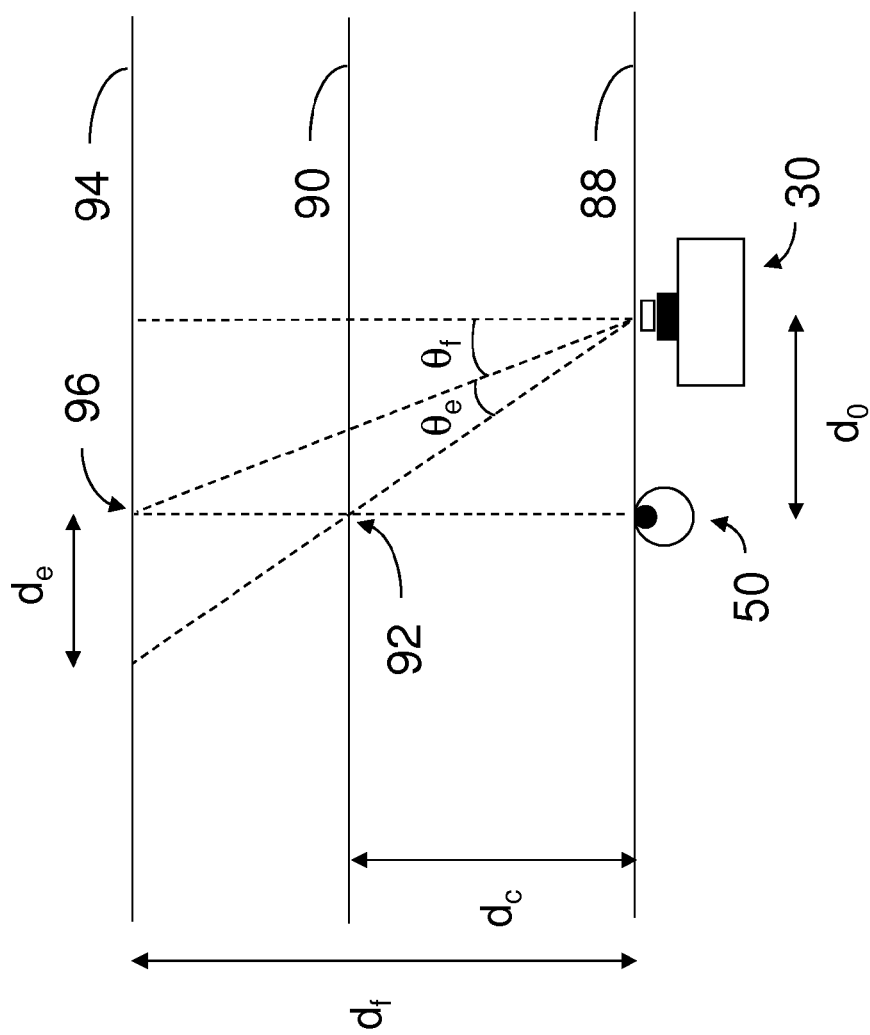
FIG. 8A is a schematic view that illustrates the effect of parallax error.

FIG. 8A depicts a two dimensional schematic illustration where, for an eye tracking device, light collected by the scene camera 30 and the tracked eye 50 follow different optical paths. This discrepancy in optical path may introduce parallax error when the user moves toward or away from a plane 90 with which the tracked eye was originally calibrated. In this example, for a user located at a plane 88, the eye tracking system is calibrated for viewing at a plane 90 positioned a distance $d_c$ from the tracked eye 50. At plane 90, an optical path from the scene camera 30 to a point of interest 92 makes an angle $\theta_e + \theta_f$ with the direction of gaze of the eye.

However, parallax error may arise if the distance between the user and the monitor increases (e.g., the user moves farther away from the monitor). In such a situation, the identifying region of the monitor is located a farther distance $d_f$ away from the user, at plane 94. When the direction of gaze of the eye shifts from the first point of interest 92, located at plane 90, to a second point of interest 96, located at plane 94, the optical path from the scene camera 30 to the second point of interest 96 forms an angle $\theta_f$ with the direction of gaze of the eye. Absent a suitable method for correcting parallax error, the system would determine the direction of gaze of the eye to be erroneously offset by an error distance $d_e$. Accordingly, when the direction of gaze of the eye shifts from the first point of interest 92 to the second point of interest 96, a system incorporating parallax error correction accounts for the associated adjustment of the angle $\theta_e + \theta_f$ corresponding to the first point of interest 92 to the angle $\theta_f$ corresponding to the second point of interest 96, hence, correcting for the error distance $d_e$. Generally, without correcting for parallax error, the greater the distance $d_0$ between the eye camera 30 and the tracked eye 50, the greater is the offset error distance $d_e$. Also, unless parallax error is corrected, the greater the difference between distances $d_f$ and $d_c$, the greater is the offset error distance $d_e$. It should be appreciated that methods described herein for parallax error correction are non-limiting, and that any suitable method that corrects for parallax error can be employed.

Parallax error, as provided in the example shown in FIG. 8A, depends on the difference between the calibrated distance $d_c$, the modified distance $d_f$ (shown in this example to be farther away than $d_c$), and the distance $d_0$ between the tracked eye 50 and the lens of the scene camera 30. Given the illustration of FIG. 8A, the relationship between the variables that give rise to parallax error can be described by the following equations:

$$\tan(\theta_e + \theta_f) = (d_e + d_0)/d_f$$

$$\tan(\theta_f) = (d_0)/d_f$$

Based on the above relationships, the error distance $d_e$ and the corrected angle $\theta_f$ can be calculated and corrected for if: the distance $d_0$ between the tracked eye 50 and the lens of the scene camera 30 is known; the pre-calibrated angle $\theta_e+\theta_f$ is known; and the distance $d_f$ between the user and the new plane 94 is measured. If provided with the above values $d_0$, $\theta_e+\theta_f$, and $d_f$, it is possible to calculate the error $d_e$ so as to correct for parallax error.

In another method of correcting for parallax error, the dimensions of the monitor may be taken into account where the distance $d_f$ may be calculated without need to measure $d_f$ directly. If the width and height of the monitor are known, by analyzing scene information collected by the scene camera, the distance $d_f$ of the user from the monitor can be determined. For example, when the dimensions of the monitor decrease when recorded in a scene image, the distance $d_f$ of the user from the monitor increases. In addition, when the dimensions of the monitor increase when recorded in a scene image, the distance $d_f$ of the user from the monitor decreases.

One of ordinary skill in the art is able to determine the relationship between changes in dimensions of a monitor as recorded in a scene image and the physical distance $d_f$ between a user and the monitor. For example, during the initial calibration step the distance $d_c$, the actual dimensions of the monitor, and the dimensions of the monitor as found in the scene camera image can be measured. When the relative distance between the user and the monitor increases or decreases, the system can analyze the scene image to determine the dimensions of the monitor as found in the scene image. Based on the initial measurement of distance $d_c$, the change in dimensions of the monitor as measured on scene images and the actual dimensions of the monitor, the updated distance $d_f$ can be determined. Accordingly, an algorithm can be employed that corrects for parallax error resulting from the offset distance $d_e$ without the necessity of measuring the distance $d_f$.

In some embodiments, parallax error may be corrected by taking calibrations of a plurality of distances from the user. In one example, having measured the dimensions of the monitor and performing an initial or first calibration at a first distance $d_c$, a calibration at a second distance $d_f$ that is different from distance $d_c$ also may be performed, as discussed. Upon performing a second calibration at a second distance different from $d_c$, for example $d_f$, the distance $d_0$ between the tracked eye 50 and the scene camera 30 may be calculated incorporating the calculated error observed based upon the first and second calibrations.

In some embodiments, cameras having depth sensing capability (e.g., the KINECT™ camera developed by MICROSOFT®) may be used to determine the distance that a camera is spaced away from an appropriate signal indicator such as an LED.

In some embodiments, the brightness of a signal emission, such as that from an LED, can be used as an indication of a distance from the monitor. Generally, the distance between a video capture device and the monitor is inversely proportional to the intensity of the signal emission recorded by the video capture device. Hence, the distance of the monitor from a scene camera 30 may be calculated based on the relative recorded intensity of signal emissions recorded from the identifying region. The intensity of light recorded I is related to the power P generated by the signal emitter and the surface area A of light emittance, by the following:

$$I=P/A$$

If the surface of light emission radiates outwardly from the source as a sphere having a radius r, then, the intensity recorded can be rewritten as:

$$I=P/(4\pi r^2)$$

Assuming a constant power output from the signal emitter, measuring the intensity of light $I_c$ at a calibration distance $d_c$ and measuring the intensity of light $I_m$ at a current distance from the monitor $d_m$ allows the current distance from the monitor $d_m$ to be determined through the following relationship:

$$I_c/I_m=(d_m)^2/(d_c)^2$$

Further, the distance $d_0$ between the tracked eye 50 and the scene camera 30 may be calculated based upon the measurement of the two calibration distances, a first calibration distance $d_{c1}$, and a second calibration distance $d_{c2}$, in the manner discussed, and a distance $d_e$ between the calculated location where the direction of the gaze of the eye intersects the monitor and the actual location where the direction of the gaze of the eye intersects the monitor. The distance $d_0$ may be given by:

$$d_0=(d_{c1})*(d_e)/(d_{c2}-d_{c1})$$

Figure 8B:
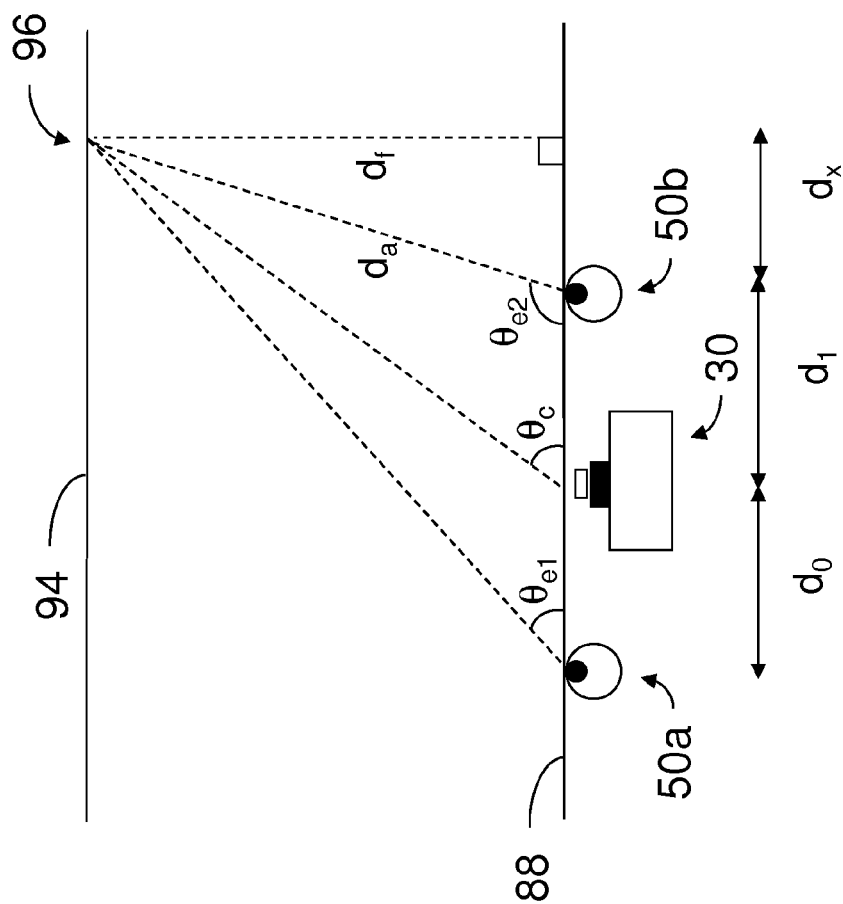
FIG. 8B is a schematic view of a system that corrects for parallax error.

Another method for correcting for parallax error is illustrated in FIG. 8B which is a schematic drawing of the system in use from above. In this method, both eyes 50a, 50b of a user are tracked and the scene camera 30 is located between the eyes. As shown in FIG. 8B, the optical path from the scene camera 30 to a point of interest 96 forms an angle $\theta_c$ with the plane 88. In addition, the optical path from one eye 50a to the point of interest 96 forms an angle $\theta_{e1}$ with the plane 88 and the optical path from the other eye 50b to the point of interest 96 forms an angle $\theta_{e2}$ with the plane 88. Each of the angles $\theta_{e1}$ and $\theta_{e2}$ can be measured by appropriately mapping the position of the center of the pupil of the eyes of the user to the respective direction of gaze for each eye in accordance with techniques described above. The distances $d_0$, $d_1$ between respective eyes 50a, 50b of the user and the scene camera 30 are also measured. Given the measured values for angles $\theta_{e1}$, $\theta_{e2}$ and distances $d_0$, $d_1$, the distance $d_f$ from the plane 88 where the user is located to the plane 94 where the point of interest 96 is located can be calculated. The angle $\theta_c$ formed between the plane 88 and the optical path from the scene camera 30 to the point of interest 96 can also be calculated. The distance $d_f$ and angle $\theta_c$ may then be used as correction factors for correcting parallax error in the horizontal direction. The relationships shown below demonstrate respective calculations that can be made for $d_f$ and $\theta_c$:

$$\theta_{e3}=180°-(\theta_{e1}+\theta_{e2})$$

$$(d_0+d_1)/\sin(\theta_{e3})=d_a/\sin(\theta_{e1})$$

$$d_a=((d_0+d_1)*\sin(\theta_{e1}))/\sin(\theta_{e3})$$

$$d_a/\sin(90°)=d_f/\sin(180°-\theta_{e2})$$

$$d_f=(d_a*\sin(180°-\theta_{e2}))/\sin(90°)$$

$$d_x/\sin)(\theta_{e2}-90°)=d_a/\sin(90°)$$

$$d_x=(d_a*))\sin(\theta_{e2}-90°))/\sin(90°)$$

$$\theta_c=\arctan((d_1+d_x)/d_f)$$

Figure 8C:
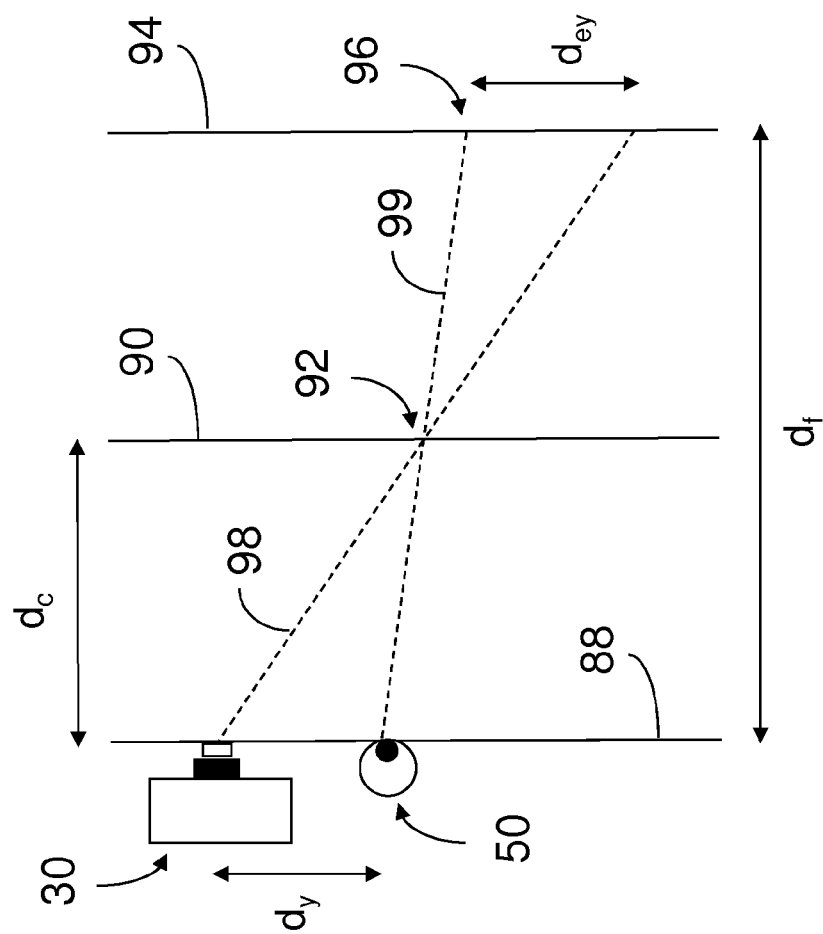
FIG. 8C is a schematic view of another system that corrects for parallax error.

Given the calculated distance $d_f$, parallax error can be corrected in the vertical direction. FIG. 8C depicts a schematic view of the system in use from the side illustrating the vertical distance $d_y$ between the scene camera 30 and the tracked eye 50. FIG. 8C also shows the error distance $d_{ey}$ that arises due to parallax once the focus of the eyes shifts from a point of interest 92 on plane 90 to a point of interest 96 on a plane 94 that is farther away from the user. The respective optical pathways of the scene camera 30 and the eye 50 trace out triangles 98, 99 which are mathematically similar triangles with respect to one another. Accordingly, the distance $d_{ey}$ may be calculated using the properties of the mathematically similar triangles 98, 99. The calculated distance $d_{ey}$ may then be used as a correction factor for determining an accurate location for the vertical direction of gaze. The distance $d_{ey}$ may be given by:

$$d_{ey} = [(d_f - d_e)/d_e] * d_y$$

Figure 8D:
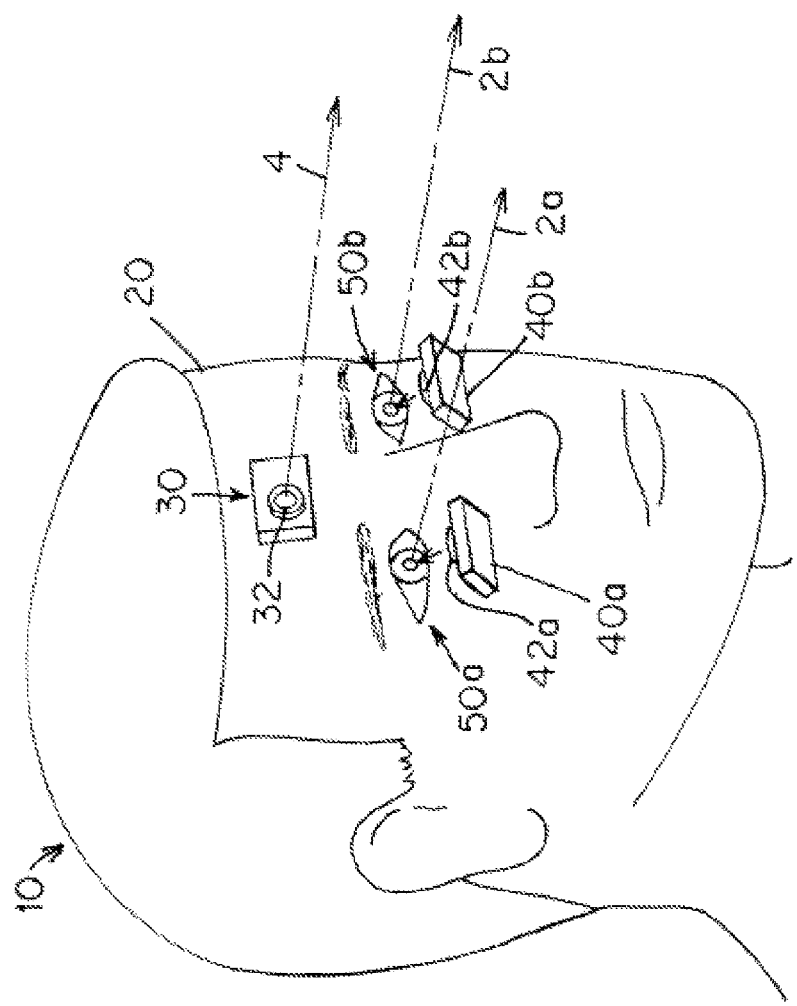
FIG. 8D is a schematic view of an embodiment of an eye tracking device having a scene camera and two eye cameras mounted on a user.

FIG. 8D depicts a user 10 having a scene camera 30, a first eye camera 40a, and a second eye camera 40b mounted to the user's head 20. The lens 32 of the scene camera 30 is directed away from the user's head 20 in a direction 4 to capture scene information and the lens 42a of eye camera 40a and the lens 42b of eye camera 40b are directed toward the user's respective eyes 50a, 50b to capture information about the position of each eye related to the directions 2a, 2b in which the eyes are looking. In this embodiment, the scene camera 30 is positioned between the user's eyes 50a and 50b.

Parallax error may also arise when the user moves in a direction that is parallel to the monitor of the computing device, as the images collected by the scene camera may exhibit a skewed perspective effect.

Figure 9A:
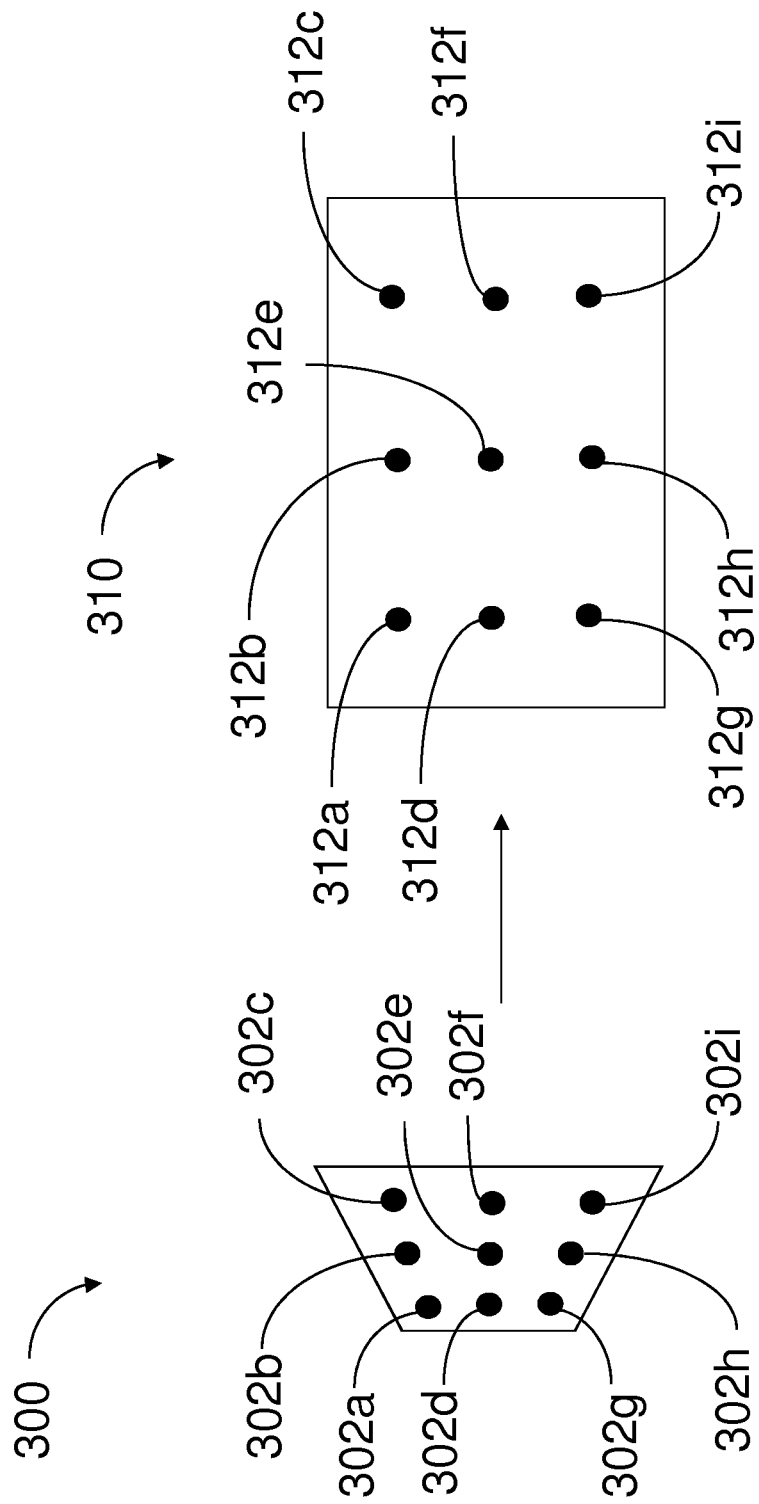
FIG. 9A is a schematic view that illustrates the effect of perspective correction in one direction.
Figure 9B:
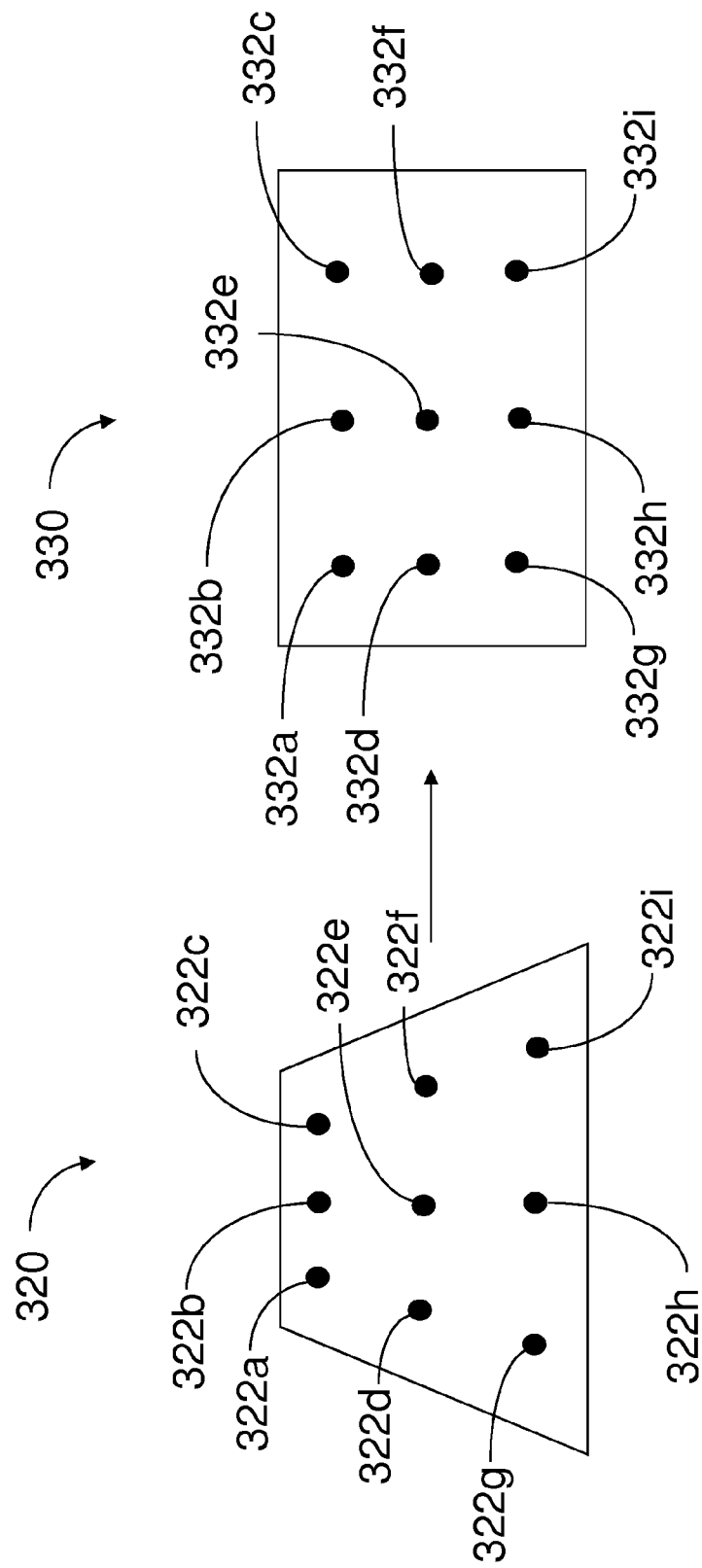
FIG. 9B is a schematic view that illustrates the effect of perspective correction in another direction.

For example, as depicted in FIGS. 9A and 9B, a scene camera that does not view the screen head-on may detect an image of a screen 300 as shown in FIG. 9A or screen 320 as shown in FIG. 9B that compresses the actual distance between points 302a-302i on screen 300 or between points 322a-322i on screen 320. Because the image of the scene camera is skewed or compressed, error may be induced in the eye tracking system as a result of such an error even though the user is physically looking at a location on the screen, as the detected location does not correspond to the location determined by the system to be the direction of gaze of a tracked eye.

Accordingly, the system may implement a perspective error correction algorithm for images recorded by the scene camera to process the scene image in recreating a corrected image of the identifying region without skew. Such a corrected image would appear as if the image were collected by the scene camera having the lens of the scene camera pointed perpendicular to the surface of the monitor, rather than at an angle. In one embodiment where perspective error correction is employed, prior to collection of images by the scene camera, the dimensions of the identifying region or the screen of the monitor are provided to the system.

FIG. 9A illustrates an image 300 of the screen of a computing device detected by the scene camera to be processed to a corrected image that shows an image 310 of the screen as if recorded from a non-angled position. As shown, the horizontal skew effect of points 302a, 302b, 302c, 302d, 302e, 302f, 302g, 302h and 302i on the screen with respect to one another is effectively adjusted by the system to points 312a, 312b, 312c, 312d, 312e, 312f, 312g, 312h and 312i on screen 310 having no skew.

Similarly, FIG. 9B depicts an image 320 of the screen of a computing device detected by the scene camera that may be processed to a corrected image 330 of the screen. The vertical skew effect of points 322a, 322b, 322c, 322d, 322e, 322f, 322g, 322h and 322i with respect to one another on the screen is adjusted by the system to points 332a, 332b, 332c, 332d, 332e, 332f, 332g, 332h and 332i on screen 330 which have no skew.

Figure 9C:
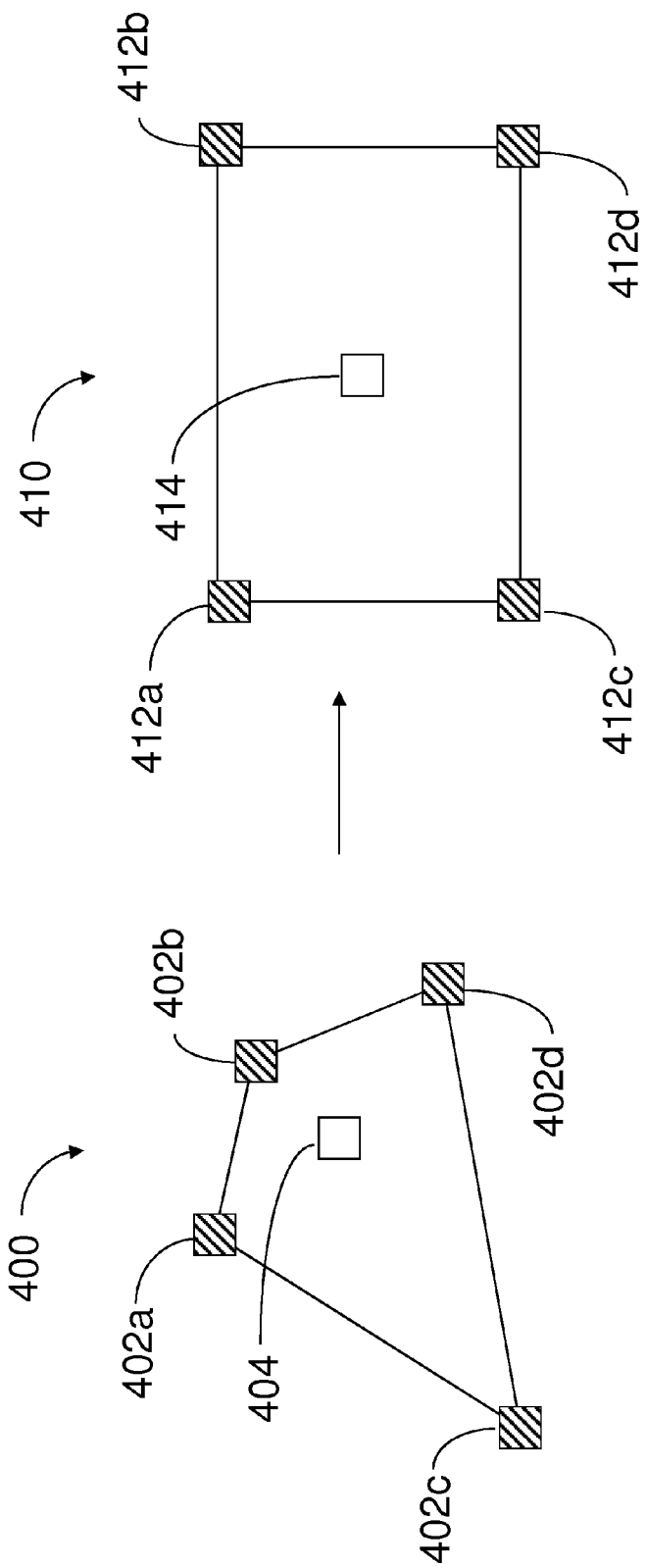
FIG. 9C is a schematic view that illustrates the effect of perspective correction in multiple directions.

Further, FIG. 9C illustrates an image 400 of the screen of a rectangular monitor as detected by the scene camera that is processed to a corrected image 410 of the screen. The screen has an identifying region provided by points 402a, 402b, 402c and 402d where the intersection 404 of the user's direction of gaze with the screen is within the boundaries defined by the identifying region. Upon application of perspective error correction, the corrected image 410 is produced with a corrected intersection 414 of the direction of gaze with the screen having an identifying region defined by points 412a, 412b, 412c and 412d. As shown, the intersection 414 of the user's direction of gaze with the screen is within the bounds of the identifying region. Thus, upon implementing perspective error correction of scene images, the system is able to more accurately track where the user is looking on a screen so that accurate input to the computing device may be provided. It can be appreciated that any suitable perspective error correction algorithm may be used.

One of ordinary skill in the art is able to employ a suitable perspective error correction algorithm to scene images collected from a scene camera so as to correct for error that arises due to detection of an identifying region of a monitor from an angle that would otherwise introduce a skewed effect. Systems and methods for perspective control in processing an image that is collected from a scene camera are described in U.S. Patent Publication No. 2010/0014770 entitled "Method and Apparatus Providing Perspective Correction And/Or Image Dewarping"; U.S. Patent Publication No. 2009/0103808 entitled "Correction Of Distortion In Captured Images"; U.S. Pat. No. 6,885,392 entitled "Perspective Correction For Preview Area Of Panoramic Digital Camera"; U.S. Pat. No. 6,057,851 entitled "Computer Graphics System Having Efficient Texture Mapping With Perspective Correction" each of which is incorporated herein by reference in its entirety.

Perspective error correction may be used in conjunction with parallax error correction to improve the accuracy of the mobile eye tracking methods described. When perspective error correction is employed on an image, points along the corrected image of the screen may vary in depth. Hence, a parallax error correction algorithm may be applied to the perspective error corrected image of the screen to adjust for such depth variation. In certain embodiments, for a rectangular monitor screen having boundary points (e.g., four points on corners of the monitor) identified on the screen, the depth at a specific intersection of the direction of gaze with the screen can be derived. As noted above, when perspective error correction is applied, the actual depth along the surface of the corrected image of the screen may vary. Thus, in one embodiment, once perspective error correction is applied to the image, parallax error correction may be subsequently applied, without limitation, to correct for variations in depth, as discussed above. For example, a skewed image recorded by the scene camera may be corrected by a suitable perspective error correction algorithm. Subsequently, the depth at each point (e.g., pixel) in the image may be corrected using parallax error correction. In some cases, as the depth over the surface of the monitor varies, parallax error correction can be performed in a recursive fashion.

In an example of a recursive method that applies parallax error correction to a perspective error corrected image, for the perspective error corrected image, an initial estimate of depth $d_m$ is provided as the average depth of the four corners defined by the identifying region. The difference of the average depth $d_m$ and the calibration distance $d_c$ is multiplied by the tangent ratio provided by the angle of error $\theta_e$ previously calculated at the second calibration (described above) to yield an initial estimation of error distance. The initial estimation of error distance is then used to recursively calculate subsequent estimations of error distance, until the error distance approaches zero. Accordingly, once a skewed image undergoes perspective error correction, methods of parallax error correction minimize the error of the direction of gaze on the perspective error corrected image, resulting in accurate tracking of a gaze of an eye from a mobile position.

Systems and methods described herein may be applicable for a number of useful applications where a user, from a mobile location, is able to send input signals to a computing device through simple movements of the eye. In some embodiments, every day operations of a computer, such as web surfing, online shopping, e-mailing, instant messaging, word processing, data analysis, and other activities may be performed from a mobile position using systems and methods described. The video gaming industry may implement aspects described so that users may provide instructions via movements of their eyes while they are mobile and playing games. If the computing device is attached to a mechanical manipulation system, objects may also be manipulated by user eye movement from mobile locations.

Mobile eye-tracking systems described may enhance a user experience when running applications that require a substantial amount of graphics rendering. For example, rather than producing a full quality graphical display on a full screen, a graphical system that tracks a direction of gaze of a user may render graphics at a particular region of priority defined by a point of intersection of the direction of gaze with a screen, with minimal rendering elsewhere. Thus, such a display rendering would result in a minimal amount of information loss with a significant reduction in computation cost, substantially improving user experience in situations where the rendering speed for full quality graphics within a full screen would result in dropped frames.

The systems and methods described herein may also be useful as educational tools, for example, in mechanical and medical fields. Employing the mobile eye tracking systems discussed, users may be trained to perform maintenance on engines or electrical circuits by providing feedback regarding locations where the user should be looking within a field of view. For example, during training, a user employing the mobile eye tracking device may be provided with feedback as to whether the user is looking at the right regions of the apparatus to be repaired. A mobile eye tracker may assist medical students in learning to perform surgeries or administer examinations. Such a system may provide feedback depending on where the student is looking in a field of view. In such cases, if a medical trainee is looking at the wrong area in a field of view during a surgery, the trainee can be informed where he or she should be looking within the field of view instead. Such feedback may be provided through any suitable method, for example, through a computing monitor, feedback device accessible to the user or by a trainer who is provided with information as to where the student is looking within the field of view. In an example, a senior surgeon may oversee a trainee in surgery by indicating where incisions should be made on a patient, and what areas of interest should be monitored, such as, areas prone to excess bleeding, regions for placement of surgical instruments, etc.

Indeed, systems where a user, from a mobile location, is able to send input signals to a computing device through simple movements of the eye, can have far-reaching applications for fields of use where users are reliant on vision. Other fields of use where systems and methods described are contemplated include music and military training.

Example One

Two Logitech Webcam Pro 9000 cameras having USB connections were used for both the eye camera and the scene camera. Logitech Quickcam Pro 9000 cameras may be used, but the Webcam Pro 9000 was observed to have a greater ability to focus at a closer distance to the eye compared to the Quickcam Pro 9000. Higher resolution images could be captured of the pupil when the camera is closer to the eye with the Webcam Pro 9000—hence, more accurate estimations of the center of the pupil can be determined. The cameras were stripped down so that they would be as light as possible. The infrared blocking filter of the cameras was replaced with infrared passing filters (Kodak 87 Wratten filter). Hot-swappable filters were also used for both the scene and eye cameras so that each camera was quickly able to switch between visible and infrared light spectrums. The scene camera was attached to a safety glasses frame with heat shrink at a distance of approximately 3.8 cm from the eye. The eye camera was attached to stiff steel wire such that the lens of the eye camera was pointed toward the eye and was positioned at a distance of approximately 2.5 cm from the eye. A hot mirror (12.5 mm×12.5 mm) was optionally used for both the scene camera and the eye camera. In some instances, hot mirrors were not used.

An infrared LED was affixed to the USB camera board with a 430 Ohm resistor to reduce current through the LED. The current through the LED was approximately 8.8 mA and the voltage drop across the LED was 1.2 volts, resulting in an input power of 10.56 mW and an irradiance level of the LED that is less than 10 mV/cm$^2$.

To prevent slippage of the device when mounted to the head of the user, an adjustable cloth strap and a rubber goggle strap were used to hold the device to the head of the user. The rubber goggle strap appeared to hold the device to the head of the user more firmly than the cloth strap.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer or computing device may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, digitizing tablets, and touch-responsive display screen, such as direct-interaction displays, multi-touch displays that respond to two or more fingers on the screen at the same time, and eye tracking systems discussed herein. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer-readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An eye tracking system that provides input to a computer, the system comprising:
    a computing device;
    a monitor coupled to the computing device, the monitor having an identifying region that is recognizable by an indication of the identifying region, wherein the computing device is programmed to recognize the indication of the identifying region;
    a first camera adapted to collect information related to a location of the identifying region of the monitor based on a location of the indication of the identifying region, the first camera being adapted to be mounted to a user such that a lens of the first camera faces away from the user; and
    a second camera having a lens that is adapted to be disposed in close proximity to and facing an eye of the user and being adapted to collect information from the eye of the user through the lens to provide an indication of a direction of gaze of the eye of the user, the information being provided as an input to the computing device.

2. The eye tracking system of claim 1, wherein the indication of the identifying region of the monitor includes at least one signal emission.

3. The eye tracking system of claim 1, further comprising at least one additional monitor coupled to the computing device and having a second identifying region that is recognizable by a second indication.

4. The eye tracking system of claim 1, further comprising at least a second monitor coupled to at least a second computing device, the second monitor having a second identifying region that is recognizable by a second indication, information collected from the second camera which provides the indication of the direction of the gaze of the eye being provided as input to the second computing device.

5. The eye tracking system of claim 1, further comprising a third camera having a lens that is adapted to be disposed in close proximity to and facing a second eye of the user, the third camera being adapted to collect supplemental information from the second eye which provides an indication of a direction of a gaze of the second eye.

6. The eye tracking system of claim 1, wherein the computing device is programmed to determine from where on the monitor the direction of gaze of the eye intersects information regarding an indication of the direction of the gaze of the eye the identifying region of the monitor.

7. A method for providing computer input by tracking a direction of a gaze of an eye, the method comprising:
   providing a computing device;
   providing a monitor of the computing device, the monitor having an indication marking an identifying region of the monitor;
   mounting a first camera to a user and positioning a lens of the first camera to face generally in a direction of the field of view of the user to collect scene information;
   mounting a second camera to the user and positioning a lens of the second camera to face toward an eye of the user to collect information relating to a direction of a gaze of an eye;
   using the scene information collected from the first camera to determine a location of the identifying region of the monitor;
   using the information collected from the second camera to determine the direction of the gaze of the eye; and
   providing input to the computing device based on the direction of the gaze of the eye.

8. The method of claim 7, wherein using the scene information collected from the first camera to determine a location of the identifying region comprises detecting light emission from the indication.

9. The method of claim 7, further comprising providing at least one second monitor having a second indication marking a second identifying region of the at least one second monitor.

10. The method of claim 9, further comprising providing input to a second computing device when the direction of the gaze of the eye falls within a boundary of the second identifying region of the at least one second monitor.

11. The method of claim 7, further comprising correcting for parallax error by mounting a third camera to the user and positioning a lens of the third camera to face toward a second eye of the user to collect supplemental information relating to a direction of a gaze of the second eye.

12. The method of claim 7, wherein providing input to the computing device occurs when the direction of the gaze of the eye falls within the identifying region.

13. The method of claim 7, further comprising utilizing an algorithm that employs a perspective correction algorithm and a parallax correction algorithm to correct for error of the direction of the gaze of the eye when the direction of the gaze of the eye falls within the identifying region of the monitor.

14. At least one non-transitory computer storage medium comprising computer-executable instructions that, when executed by at least one processor, perform a method for calculating a location of a center of a pupil of an eye, the method comprising:
   a) generating an image of a pupil of an eye comprising a distribution of pixels, each pixel having an intensity value and a geometric position on the image;
   b) selecting pixels having intensity values that fall within a defined range of intensity values;
   c) determining an average geometric position of the pixels having intensity values that fall within the defined range, the average geometric position being a first starting point for determining a location of a center of the pupil of the eye on the image;
   d) making measurements of a value of pixel intensity along lines extending in a plurality of directions away from the starting point;
   e) for each of the lines extending away from the starting point, determining a stop point, each stop point being determined based on a pixel intensity change exceeding a first threshold;
   f) for each stop point, making measurements of a value of pixel intensity along lines extending in a plurality of directions from the stop point back toward the starting point and at a plurality of points adjacent to the starting point;
   g) for each line from the stop point back to the starting point and a plurality of points adjacent to the starting point, defining a feature point having a geometric position, each feature point being determined based on a pixel intensity change exceeding second threshold; and
   h) averaging the geometric positions of the feature points to calculate a second starting point for determining the location of the center of the pupil of the eye on the image.

15. The non-transitory computer storage medium of claim 14, further comprising repeating steps d), e), f), g) and h) for at least one iteration until a difference between a geometric position of the first starting point and the second starting point is less than about 1% in distance.

16. The non-transitory computer storage medium of claim 14, wherein averaging the geometric positions of the plurality of feature points comprises averaging the geometric positions of the plurality of feature points that are accumulated for every iteration of the at least one iteration.

17. The non-transitory computer storage medium of claim 14, wherein averaging the geometric positions of the plurality of feature points comprises averaging the geometric positions of the plurality of feature points that are accumulated for only a current iteration of the at least one iteration.

18. A method for estimating a location of a center of a pupil of an eye from an image of the eye having pixels, the method comprising:
   generating an image of a pupil of an eye comprising a distribution of pixels, each pixel having an intensity value and a geometric position on the image;
   selecting pixels having intensity values that fall within a defined range of intensity values;
   determining the geometric positions of the pixels having intensity values that fall within the defined range of intensity values;
   determining an average geometric position of the pixels having intensity values that fall within the defined range, the average geometric position being a first starting point for determining a location of a center of the pupil of the eye on the image;
   making measurements of a value of pixel intensity along lines extending in a plurality of directions away from the starting point;
   for each of the lines extending away from the starting point, determining a stop point, each stop point being determined based on a pixel intensity change exceeding a first threshold;
   for each stop point, making measurements of a value of pixel intensity along lines extending in a plurality of directions from the stop point back toward the starting point and at a plurality of points adjacent to the starting point;

for each line from the stop point back to the starting point and a plurality of points adjacent to the starting point, defining a feature point having a geometric position, each feature point being determined based on a pixel intensity change exceeding a second threshold; and averaging the geometric positions of the feature points to calculate a second starting point for determining the location of the center of the pupil of the eye on the image.

19. A mobile eye tracking system, the system comprising:

an identifying region of a field of view, the identifying region being recognizable by an indication;

a computing device programmed to recognize the indication of the field of view;

a first camera adapted to collect information related to a location of the identifying region of the field of view based on the indication of the identifying region, the first camera being adapted to be mounted to a user such that a lens of the first camera faces away from the user; and a second camera adapted to collect information through a lens from the eyes from which a direction of a gaze of an eye of the user may be determined, the lens being adapted to be disposed in close proximity to and facing an eye of the user, the information collected from the second camera being provided as an input to the computing device.

20. A method for providing computer input based upon a direction of a gaze of an eye of a user, the method comprising:

providing an indication marking an identifying region of a field of view;

mounting a first camera to the user and positioning a lens of the first camera to face away from the user to collect scene information;

mounting a second camera to the user and positioning a lens of the second camera to face the eye of the user to collect information from the eye from which a direction of gaze of the eye may be determined;

determining a location of the identifying region of the field of view from the indication based upon the scene information collected from the first camera;

determining the direction of the gaze of the eye using the information collected from the second camera; and providing an input to the computing device based on a location of an intersection of the direction of the gaze of the eye and the identifying region of the field of view.

* * * * *